(12) United States Patent
Khoshnevisan et al.

(10) Patent No.: US 11,653,361 B2
(45) Date of Patent: May 16, 2023

(54) FEEDBACK TECHNIQUES FOR DOWNLINK CONTROL INFORMATION ON A PHYSICAL DOWNLINK SHARED CHANNEL

(71) Applicant: QUALCOMM Incorporated, San Diego, CA (US)

(72) Inventors: Mostafa Khoshnevisan, San Diego, CA (US); Jing Sun, San Diego, CA (US); Xiaoxia Zhang, San Diego, CA (US); Tao Luo, San Diego, CA (US); Wooseok Nam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 50 days.

(21) Appl. No.: 17/219,358

(22) Filed: Mar. 31, 2021

(65) Prior Publication Data
US 2022/0322403 A1 Oct. 6, 2022

(51) Int. Cl.
*H04W 56/00* (2009.01)
*H04W 72/12* (2023.01)
*H04B 7/0456* (2017.01)
*H04W 24/08* (2009.01)
*H04W 72/0446* (2023.01)
*H04W 72/1273* (2023.01)

(52) U.S. Cl.
CPC ...... *H04W 72/1289* (2013.01); *H04B 7/0456* (2013.01); *H04W 24/08* (2013.01); *H04W 72/0446* (2013.01); *H04W 72/1257* (2013.01); *H04W 72/1273* (2013.01)

(58) Field of Classification Search
CPC ............. H04W 72/1289; H04W 24/08; H04W 72/0446; H04W 72/1257; H04W 72/1273; H04B 7/0456
USPC ........................................................ 370/329
See application file for complete search history.

(56) References Cited

U.S. PATENT DOCUMENTS

| 2017/0026940 A1* | 1/2017 | Moulsley ................ H04L 47/34 |
| 2019/0199477 A1* | 6/2019 | Park ......................... H04L 1/00 |
| 2020/0266937 A1 | 8/2020 | Khoshnevisan et al. |

(Continued)

OTHER PUBLICATIONS

International Search Report and Written Opinion—PCT/US2022/018759—ISA/EPO—dated Oct. 19, 2022.

(Continued)

*Primary Examiner* — Sai Ming Chan
(74) *Attorney, Agent, or Firm* — QUALCOMM Incorporated

(57) ABSTRACT

Methods, systems, and devices for wireless communication are described. A user equipment (UE) may receive multiple downlink control information (DCI) messages from a base station, where each of the multiple DCI messages schedules a respective downlink transmission. Some of the DCI messages may be multiplexed with downlink transmissions. The UE may identify, for each downlink transmission multiplexed with one of the multiple DCI messages, a time period including a beginning of the downlink transmission, and the UE may determine an order of the multiple DCI messages based on the time period. The UE may transmit a feedback message to the base station for the respective downlink transmissions based on the determined order. The UE may transmit the feedback message to the base station on uplink resources indicated by a last DCI message in the determined order.

30 Claims, 13 Drawing Sheets

(56) References Cited

U.S. PATENT DOCUMENTS

| | | | | |
|---|---|---|---|---|
| 2020/0382174 | A1* | 12/2020 | Shao | H04L 1/1861 |
| 2020/0413305 | A1* | 12/2020 | Rahman | H04W 56/0045 |
| 2021/0092744 | A1 | 3/2021 | Khoshnevisan et al. | |
| 2021/0274521 | A1* | 9/2021 | Yuan | H04W 72/0453 |
| 2022/0007404 | A1* | 1/2022 | Gou | H04L 1/1854 |
| 2022/0030577 | A1* | 1/2022 | Zhou | H04L 1/0026 |
| 2022/0053493 | A1* | 2/2022 | Yang | H04W 72/0453 |

OTHER PUBLICATIONS

QUALCOMM: "E-mail Discussions on 2-Stage DCI for NR", 3GPP Draft, TSG-RAN WG1 #88, R1-1702629 E-mail Discussions on 2-Stage DCI for NR, 3rd Generation Partnership Project (3GPP), Mobile Competence Centre, 650, Route Des Lucioles, F-06921, Sophia-Antipolis Cedex, France, vol. RAN WG1. No. Athens, Greece, Feb. 13, 2017-Feb. 17, 2017, Feb. 15, 2017, (Feb. 15, 2017), XP051222023, 12 pages, Sections 1, 3, 4, Sections 2 and 4.1, section 3, paragraph [04.1].

* cited by examiner

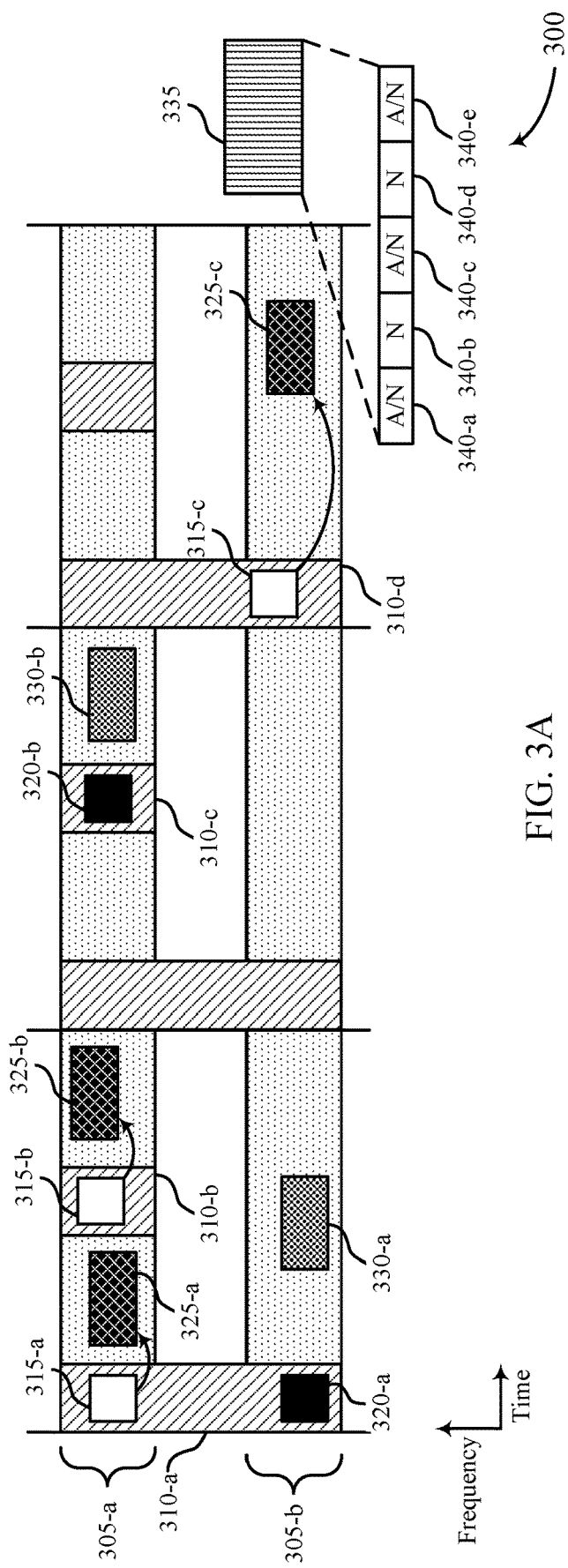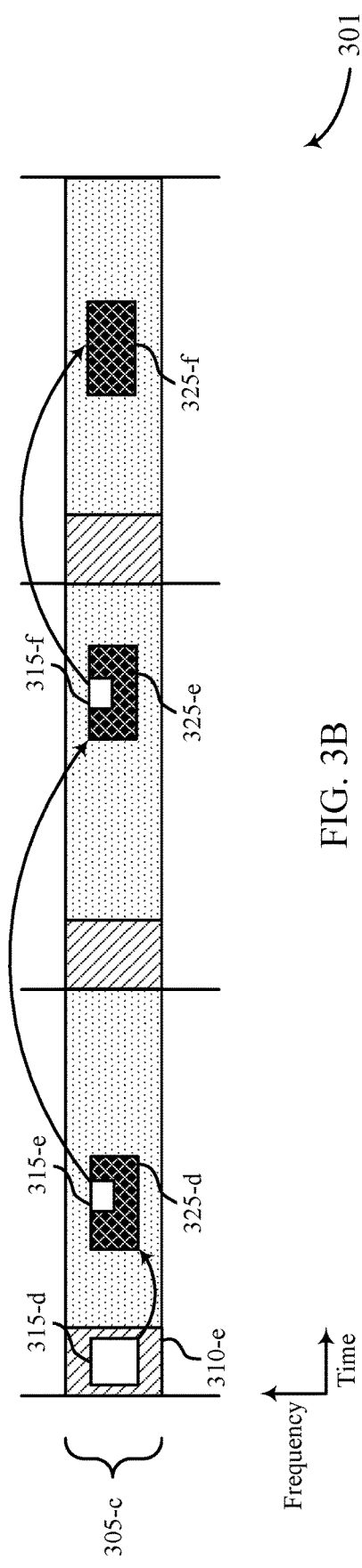
FIG. 3A
FIG. 3B

FEEDBACK TECHNIQUES FOR DOWNLINK CONTROL INFORMATION ON A PHYSICAL DOWNLINK SHARED CHANNEL

FIELD OF TECHNOLOGY

The following relates to wireless communication, including feedback techniques for downlink control information (DCI) on a physical downlink shared channel (PDSCH).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a base station may transmit downlink control information (DCI) messages to a UE on physical downlink shared channel (PDSCH) resources. In some cases, the UE may be unable to determine if the UE missed (e.g., was unable to decode) one or more of the DCI messages on the PDSCH resources.

SUMMARY

The described techniques relate to improved methods, systems, devices, and apparatuses that support feedback techniques for downlink control information (DCI) on a physical downlink shared channel (PDSCH). Generally, the described techniques provide for ordering DCI messages that a base station may transmit to a user equipment (UE). Each of the DCI messages may schedule a subsequent PDSCH transmission from the base station. In some examples, the base station may multiplex one or more of the DCI messages with one or more PDSCH transmissions. The DCI messages may include one or more fields that indicate, to the UE, an order of the DCI messages or a total number of DCI messages transmitted, or both. The UE may accordingly use the indicated order and total number of DCI messages to determine whether the UE missed (e.g., unsuccessfully decoded) any of the DCI messages transmitted by the base station. As an example, the one or more multiplexed DCI messages may be ordered based on a scheduling unit (e.g., a time period) associated with each of the one or more PDSCH transmissions (e.g., a starting symbol period associated with each of the one or more PDSCH transmissions, a component carrier (CC) index of a subsequent PDSCH transmission scheduled by the one or more multiplexed DCI messages, or a combination thereof). Based on the determined order of the DCI messages, the UE may indicate an acknowledgement (ACK) or a negative ACK (NACK) for each PDSCH transmission scheduled by the DCI messages (e.g., in a hybrid automatic repeat request (HARD)-ACK codebook) and may transmit a feedback message to the base station on physical uplink control channel (PUCCH) resources indicated by a last DCI message in the ordered DCI messages.

A method for wireless communication at a UE is described. The method may include receiving two or more DCI messages that each schedule respective downlink transmissions, where at least one DCI message of the two or more DCI messages is multiplexed with a downlink transmission and schedules an additional downlink transmission that is after the downlink transmission, and where a feedback message for the respective downlink transmissions is to be transmitted during a same transmission occasion, identifying, for each downlink transmission that is multiplexed with a DCI message, a time period including a beginning of the downlink transmission, determining an order of the two or more DCI messages based on the time period including the beginning of the downlink transmission, and transmitting, during the same transmission occasion, the feedback message for the respective downlink transmissions scheduled by the two or more DCI messages, where the feedback message is based on the order of the two or more DCI messages.

An apparatus for wireless communication at a UE is described. The apparatus may include a processor, memory coupled with the processor, and instructions stored in the memory. The instructions may be executable by the processor to cause the apparatus to receive two or more DCI messages that each schedule respective downlink transmissions, where at least one DCI message of the two or more DCI messages is multiplexed with a downlink transmission and schedules an additional downlink transmission that is after the downlink transmission, and where a feedback message for the respective downlink transmissions is to be transmitted during a same transmission occasion, identify, for each downlink transmission that is multiplexed with a DCI message, a time period including a beginning of the downlink transmission, determine an order of the two or more DCI messages based on the time period including the beginning of the downlink transmission, and transmit, during the same transmission occasion, the feedback message for the respective downlink transmissions scheduled by the two or more DCI messages, where the feedback message is based on the order of the two or more DCI messages.

Another apparatus for wireless communication at a UE is described. The apparatus may include means for receiving two or more DCI messages that each schedule respective downlink transmissions, where at least one DCI message of the two or more DCI messages is multiplexed with a downlink transmission and schedules an additional downlink transmission that is after the downlink transmission, and where a feedback message for the respective downlink transmissions is to be transmitted during a same transmission occasion, means for identifying, for each downlink transmission that is multiplexed with a DCI message, a time period including a beginning of the downlink transmission, means for determining an order of the two or more DCI messages based on the time period including the beginning of the downlink transmission, and means for transmitting, during the same transmission occasion, the feedback message for the respective downlink transmissions scheduled by the two or more DCI messages, where the feedback message is based on the order of the two or more DCI messages.

A non-transitory computer-readable medium storing code for wireless communication at a UE is described. The code may include instructions executable by a processor to receive two or more DCI messages that each schedule respective downlink transmissions, where at least one DCI message of the two or more DCI messages is multiplexed with a downlink transmission and schedules an additional downlink transmission that is after the downlink transmission, and where a feedback message for the respective downlink transmissions is to be transmitted during a same transmission occasion, identify, for each downlink transmission that is multiplexed with a DCI message, a time period including a beginning of the downlink transmission, determine an order of the two or more DCI messages based on the time period including the beginning of the downlink transmission, and transmit, during the same transmission occasion, the feedback message for the respective downlink transmissions scheduled by the two or more DCI messages, where the feedback message is based on the order of the two or more DCI messages.

In some examples of the method, apparatuses, and non-transitory computer-readable medium described herein, determining the order of the two or more DCI messages may include operations, features, means, or instructions for identifying a first downlink transmission that may be multiplexed with a first DCI message of the two or more DCI messages, where a first symbol period includes a beginning of the first downlink transmission, identifying a second downlink transmission multiplexed with a second DCI message of the two or more DCI messages, where a second symbol period that may be different from the first symbol period includes a beginning of the second downlink transmission, and determining an order of the first DCI message and the second DCI message based on an order of the first symbol period and the second symbol period.

In some examples of the method, apparatuses, and non-transitory computer-readable medium described herein, the first symbol period may be before the second symbol period and the method, apparatuses, and non-transitory computer-readable medium may include further operations, features, means, or instructions for determining that the first DCI message may be ordered before the second DCI message based on the first symbol period being before the second symbol period.

In some examples of the method, apparatuses, and non-transitory computer-readable medium described herein, the first symbol period may be within a first scheduling unit including a first set of one or more symbol periods and the second symbol period may be within a second scheduling unit including a second set of one or more symbol periods and the method, apparatuses, and non-transitory computer-readable medium may include further operations, features, means, or instructions for determining the order of the first DCI message and the second DCI message based on an order of the first scheduling unit and the second scheduling unit.

In some examples of the method, apparatuses, and non-transitory computer-readable medium described herein, one or both of the first scheduling unit or the second scheduling unit includes at least one of a slot, a set of seven symbol periods within a slot, a set of four symbol periods within a slot, a set of six symbol periods in a slot, or a single symbol period.

In some examples of the method, apparatuses, and non-transitory computer-readable medium described herein, determining the order of the two or more DCI messages may include operations, features, means, or instructions for identifying a first carrier index value associated with a third downlink transmission scheduled by the first DCI message, where the first symbol period may be within a scheduling unit including a set of one or more symbol periods, identifying a second carrier index value associated with a fourth downlink transmission that may be scheduled by the second DCI message, where the second symbol period may be within the scheduling unit, and determining the order of the first DCI message and the second DCI message based on an order of the first carrier index value and the second carrier index value.

In some examples of the method, apparatuses, and non-transitory computer-readable medium described herein, the first carrier index value may be less than the second carrier index value and the first symbol period may be after the second symbol period within the scheduling unit and the method, apparatuses, and non-transitory computer-readable medium may include further operations, features, means, or instructions for determining that the second DCI message may be ordered before the first DCI message based on the first symbol period being after the second symbol period.

In some examples of the method, apparatuses, and non-transitory computer-readable medium described herein, the first carrier index value may be less than the second carrier index value and the first symbol period may be before the second symbol period within the scheduling unit and the method, apparatuses, and non-transitory computer-readable medium may include further operations, features, means, or instructions for determining that the first DCI message may be ordered before the second DCI message based on the first carrier index value being less than the second carrier index value and the first symbol period and the second symbol period being within the scheduling unit.

In some examples of the method, apparatuses, and non-transitory computer-readable medium described herein, the first downlink transmission and the third downlink transmission may be included in a same CC.

In some examples of the method, apparatuses, and non-transitory computer-readable medium described herein, the first downlink transmission and the third downlink transmission may be included in different CCs.

In some examples of the method, apparatuses, and non-transitory computer-readable medium described herein, a duration of the set of one or more symbol periods of the scheduling unit, or a duration of the scheduling unit, or both, may be based on a symbol duration of a CC having a threshold subcarrier spacing (SCS).

Some examples of the method, apparatuses, and non-transitory computer-readable medium described herein may further include operations, features, means, or instructions for determining an order for counter downlink assignment index (cDAI) values of each of the two or more DCI messages based on an accumulative number of resource pairs in which the two or more DCI messages may have been transmitted up to a scheduled carrier index and up to a first scheduling unit, each resource pair of the accumulative number of resource pairs including a serving cell and a scheduling unit including one or more symbol periods and generating a codebook based on the cDAI values and the order for the cDAI values, where the transmitted feedback message includes the codebook.

Some examples of the method, apparatuses, and non-transitory computer-readable medium described herein may further include operations, features, means, or instructions for determining an order for total downlink assignment index (tDAI) values of the two or more DCI messages based on a number of resource pairs in which the two or more DCI messages may have been transmitted up to a current scheduling unit, each resource pair of the number of resource pairs including a serving cell and a scheduling unit including one or more symbol periods and generating a codebook based on the tDAI values and the order for the tDAI values, where the transmitted feedback message includes the codebook.

Some examples of the method, apparatuses, and non-transitory computer-readable medium described herein may further include operations, features, means, or instructions for updating a tDAI value based on receiving respective DCI messages that may be associated with different scheduling units, where the codebook for the feedback message based on the updated tDAI value.

Some examples of the method, apparatuses, and non-transitory computer-readable medium described herein may further include operations, features, means, or instructions for identifying a last DCI message of the two or more DCI messages based on the order of the two or more DCI messages and identifying a set of uplink resources associated with the same transmission occasion based on a resource indicator field of the last DCI message.

In some examples of the method, apparatuses, and non-transitory computer-readable medium described herein, receiving the two or more DCI messages may include operations, features, means, or instructions for receiving one or more DCI messages within at least one monitoring occasion, each of the one or more DCI messages scheduling a respective downlink transmission, and where determining the order of the two or more DCI messages includes and determining an order of the one or more DCI messages based on the at least one monitoring occasion.

Some examples of the method, apparatuses, and non-transitory computer-readable medium described herein may further include operations, features, means, or instructions for identifying a first DCI message in a first monitoring occasion, where a first symbol period includes a beginning of the first monitoring occasion, and where determining the order of the two or more DCI messages includes and determining the order of the two or more DCI messages based on an order of the first symbol period and the time period including the beginning of each downlink transmission that may be multiplexed with a DCI message.

Some examples of the method, apparatuses, and non-transitory computer-readable medium described herein may further include operations, features, means, or instructions for identifying a first DCI message in a first monitoring occasion, identifying a second DCI message in a second monitoring occasion, determining a first order of the first DCI message and the second DCI message based on the first monitoring occasion and the second monitoring occasion, and determining a second order of the at least one DCI message of the two or more DCI messages that may be multiplexed with a downlink transmission.

Some examples of the method, apparatuses, and non-transitory computer-readable medium described herein may further include operations, features, means, or instructions for generating a first sub-codebook based on the first order of the first DCI message and the second DCI message and generating a second sub-codebook based on the second order of the at least one DCI message of the two or more DCI messages that may be multiplexed with a downlink transmission, where the feedback message includes the first sub-codebook and the second sub-codebook.

Some examples of the method, apparatuses, and non-transitory computer-readable medium described herein may further include operations, features, means, or instructions for determining a last DCI message from the one or more DCI messages, where a set of uplink resources associated with the same transmission occasion may be based on a resource indicator field of the last DCI message.

Some examples of the method, apparatuses, and non-transitory computer-readable medium described herein may further include operations, features, means, or instructions for determining a last DCI message from the at least one DCI message that may be multiplexed with a downlink transmission, where a set of uplink resources associated with the same transmission occasion may be based on a resource indicator field of the last DCI message.

BRIEF DESCRIPTION OF THE DRAWINGS

FIGS. 3A, 3B, and 4 illustrate examples of resource maps that support feedback techniques for DCI on a PDSCH in accordance with aspects of the present disclosure.

DETAILED DESCRIPTION

Figure 1:
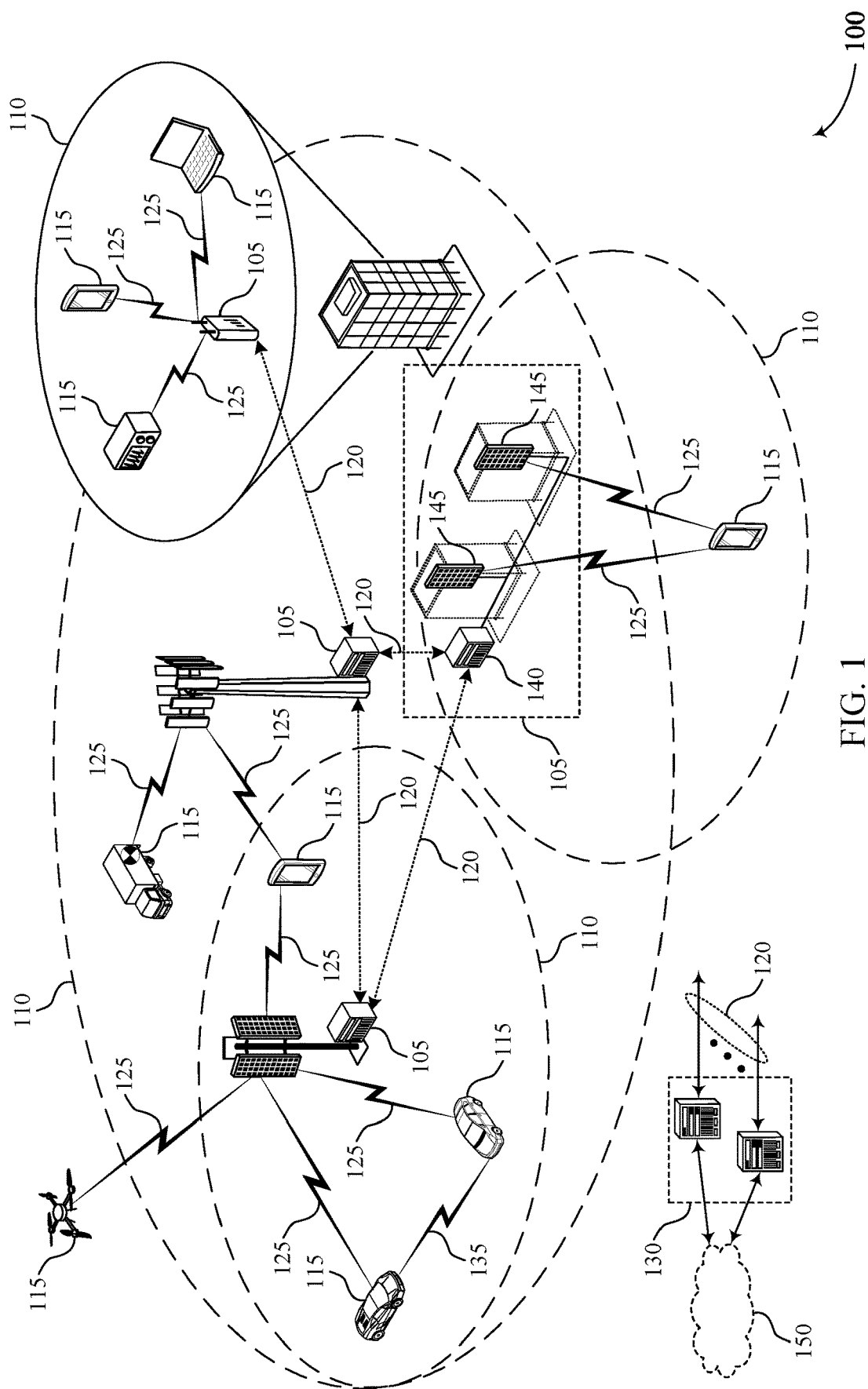
FIGS. 1 and 2 illustrate examples of wireless communications systems that support feedback techniques for downlink control information (DCI) on a physical downlink shared channel (PDSCH) in accordance with aspects of the present disclosure.

In some wireless communications systems, a base station may transmit multiple downlink control information (DCI) messages to a user equipment (UE) during one or more physical downlink control channel (PDCCH) monitoring occasions (PMOs). Each DCI message may indicate a set of physical downlink shared channel (PDSCH) resources on which the UE may receive one or more subsequent PDSCH transmissions from the base station, as well as a set of physical uplink control channel (PUCCH) resources on which the UE may transmit a feedback message (e.g., hybrid automatic repeat request (HARQ)-acknowledgment (ACK) feedback) for the subsequent PDSCH transmission(s). In some cases, a flexible frame structure and dynamic indications of HARQ feedback timing may be used. For instance, a time offset between reception of a downlink message (e.g., a PDSCH, a PDCCH) and transmission of corresponding HARQ feedback may be variable, and one or more DCI messages may be received prior to, and share a same, PUCCH transmission occasion. The system may also utilize codebook-based HARQ feedback, where multiple HARQ feedback indications (e.g., ACK/negative acknowledgment (NACK)) may be transmitted simultaneously on a single feedback occasion (e.g., within a feedback report), and respective information bits representing detected messages may be encoded in a HARQ-ACK codebook.

In some examples of codebook-based feedback schemes, DCI messages may indicate a counter downlink assignment indicator (cDAI) value and, in some cases, a total downlink assignment indicator (tDAI) value. The cDAI value may indicate a cumulative or aggregate number of DCI messages in the one or more PMOs (e.g., incremented from one DCI message to a next DCI message), while the tDAI value may indicate a total number of DCI messages in the one or more PMOs (e.g., if the base station is using carrier aggregation). For example, if the base station transmits, during a PMO, a first DCI message to the UE on a first carrier and a second DCI message to the UE on a second carrier, the first DCI message may indicate a first cDAI value and a tDAI value (e.g., {1,2}), while the second DCI message may indicate a second cDAI value and the tDAI value (e.g., {2,2}). In such cases, the UE may determine whether the UE has successfully received each DCI message in the PMO based on these cDAI and tDAI values. If the UE misses (e.g., fails to decode) the first DCI message but receives the second DCI message, the UE may determine that the UE missed the first DCI message based on the second cDAI value and the tDAI value indicated by the second DCI message. In other words, the UE may determine that the base station transmitted two DCI messages in the PMO (e.g., on different carriers), and that one of the two DCI messages was missed (e.g., because one DCI message was received).

The UE may accordingly transmit feedback (e.g., HARQ-ACK feedback) to the base station for PDSCH transmissions scheduled by the first and second DCI messages. In such cases, the UE may indicate whether the UE received (e.g., decoded) each scheduled PDSCH transmission by transmitting a codebook to the base station. The codebook may include entries corresponding to cDAI values of the first and second DCI messages. Thus, if the UE misses the first DCI message and receives the second DCI message, the codebook may include a first entry indicating a NACK for a first PDSCH transmission scheduled by the first DCI message (e.g., because the UE was unable to decode the first DCI message) and a second entry indicating either an ACK or a NACK for a second PDSCH transmission scheduled by the second DCI message (e.g., based on whether the UE was able to successfully receive and decode the second PDSCH transmission).

In some cases, however, the base station may transmit a DCI message to the UE outside of a PMO. For example, the base station may transmit a DCI message to the UE on a set of PDSCH resources. That is, the base station may multiplex a DCI message with a PDSCH transmission and may transmit both the DCI message and the PDSCH transmission on the set of PDSCH resources. In such cases, the multiplexed DCI message may be referred to as a "piggyback DCI" message or some other terminology. Transmitting a piggyback DCI on a set of PDSCH resources may reduce power consumption, decrease latency, and improve spectral efficiency at the UE. For example, receiving a piggyback DCI on a set of PDSCH resources may consume less power than performing a blind search for a DCI message in a PMO. However, because the base station may transmit a piggyback DCI message outside of a PMO, a cDAI value, a tDAI value, or both, may not account for the piggyback DCI message (e.g., because cDAI and tDAI values may only be defined for DCI messages transmitted in PMOs). As a result, the UE may be unable to determine how many DCI messages have been transmitted, an order of the DCI message, or whether the UE missed a piggyback DCI message from the base station.

In accordance with aspects of the present disclosure, techniques may be used for indicating an order for multiple DCI messages (e.g., including piggyback DCI messages) transmitted to the UE. As an example, the UE may be configured (e.g., via RRC signaling) with an ordering scheme that the UE may use (in combination with the indicated order) to determine whether the UE missed any piggyback DCI messages transmitted from the base station. In such cases, one or more DCI messages may be ordered based on starting symbols or scheduling units (e.g., time periods) of PDSCH transmissions with which piggyback DCI messages are multiplexed. For instance, a first DCI message may be multiplexed with a first PDSCH transmission, and a second DCI message may be multiplexed with a second PDSCH transmission. Based on an order of a respective starting symbol of each PDSCH transmission (e.g., an orthogonal frequency-division multiplexing (OFDM) symbol period in which the PDSCH transmission begins in the time domain), the respective scheduling units (e.g., a slot, a set of symbols, or the like) that include the respective starting symbols, or any combination thereof, a UE may determine an order of the first and second DCI messages. Additionally or alternatively, the piggyback DCI messages may be ordered based on component carrier (CC) indices of subsequent PDSCH transmissions scheduled by the piggyback DCI messages.

When configured with codebook-based feedback, the UE may identify a cDAI value, a tDAI value, or both for each piggyback DCI message (e.g., based on one or more fields included in each DCI), where the cDAI and/or tDAI values may be based on a scheduling unit (e.g., instead of a PMO). In some examples, the UE may determine an order for DCI messages transmitted in PMOs and an order for piggyback DCI messages transmitted on PDSCH resources (e.g., outside the one or more PMOs), and the UE may include sub-codebooks for different types of DCIs in the feedback message. Additionally or alternatively, the ordering of all DCI messages received (e.g., piggyback DCI messages and DCI messages received during PMOs) may be based on the order of the starting symbol, the scheduling unit, or both, of the respective downlink transmissions (PDSCH, PDCCH) in which the DCIs are transmitted. In any case, if the UE determines that a DCI message has been missed, the UE may place a NACK for the missed DCI message in a corresponding entry of a HARQ-ACK codebook. Accordingly, the UE may transmit the HARQ-ACK codebook to the base station on a set of PUCCH resources indicated by a last DCI message of the piggyback DCI messages.

Aspects of the present disclosure may be implemented to realize one or more of the following advantages. The described techniques may provide for enhanced downlink communications between a base station and a UE. More specifically, the described techniques may enable a UE to receive one or more DCI messages from a base station with improved reliability. For example, the UE may reduce a number of missed (e.g., unsuccessfully received or decoded) DCI messages based on receiving an indication (e.g., from the base station) of an order for each DCI message. The order may enable the UE to identify missed DCI messages, even if the missed DCI messages are transmitted outside of a PMO.

Aspects of the disclosure are initially described in the context of wireless communications systems. Aspects of the disclosure are illustrated by and described with reference to resource maps and process flows. Aspects of the disclosure are further illustrated by and described with reference to apparatus diagrams, system diagrams, and flowcharts that relate to feedback techniques for DCI on a PDSCH.

FIG. 1 illustrates an example of a wireless communications system 100 that supports feedback techniques for DCI on a PDSCH in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets (e.g., corresponding to monitoring occasions), and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. HARQ feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In the wireless communications system 100, a base station 105 may transmit one or more DCI messages to a UE 115. Each of the DCI messages may schedule a subsequent PDSCH transmission from the base station 105. In some examples, the base station 105 may indicate, to the UE 115, an order for the DCI messages. The UE 115 may use the indicated order to determine whether the UE 115 missed (e.g., unsuccessfully decoded) any of the DCI messages. In some examples, the base station 105 may multiplex one or more of the DCI messages with one or more respective PDSCH transmissions and may transmit the one or more DCI messages on PDSCH resources with the one or more PDSCH transmissions (which may be referred to herein as piggyback DCIs). In such examples, the one or more multiplexed DCI messages may be ordered based on a scheduling unit (e.g., a time period) associated with each of the one or more multiplexed PDSCH transmissions, a starting symbol associated with each of the one or more multiplexed PDSCH transmissions, a CC index of a subsequent PDSCH transmission scheduled by each of the one or more multiplexed DCI messages, or a combination thereof. The UE 115 may include an ACK or a NACK for each of the subsequent PDSCH transmissions scheduled by the DCI messages in a feedback message (e.g., including a HARQ-ACK codebook) and may transmit the HARQ-ACK codebook to the base station 105 on PUCCH resources indicated by a last DCI message indicated by the order.

Figure 2:
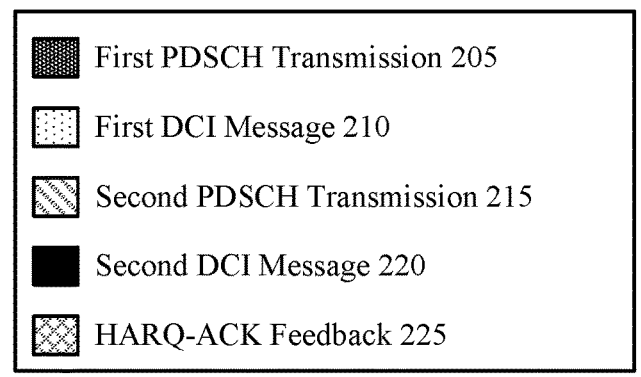
Figure 2:
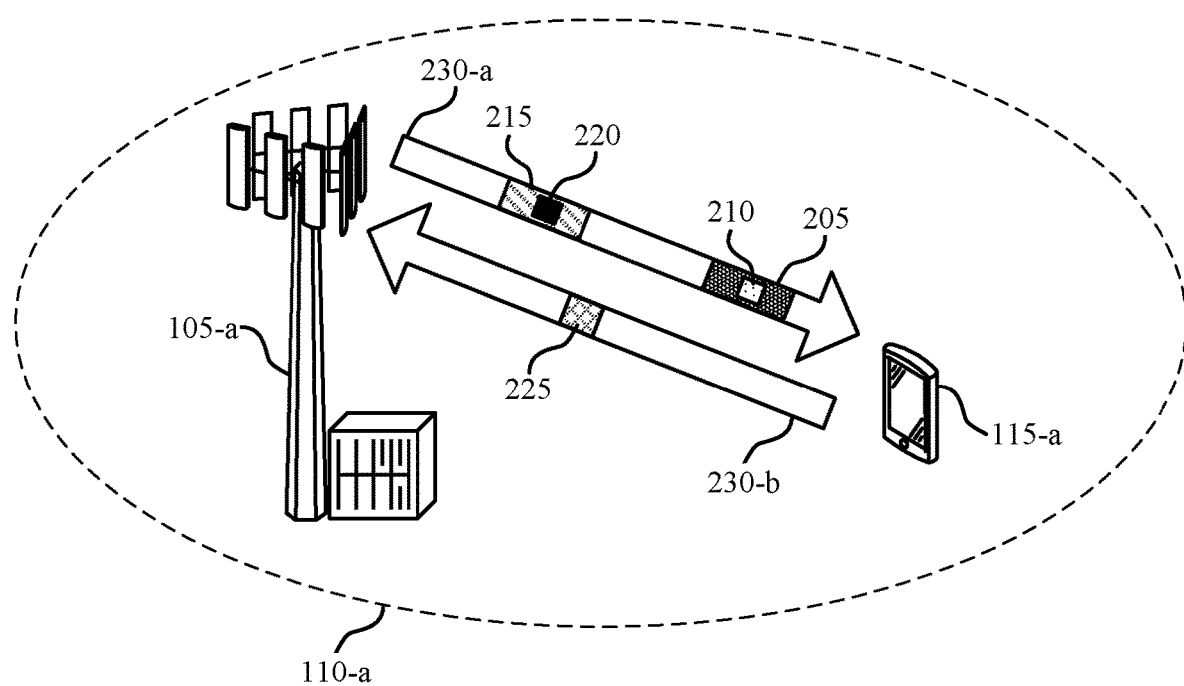

FIG. 2 illustrates an example of a wireless communications system 200 that supports feedback techniques for DCI on a PDSCH in accordance with aspects of the present disclosure. In some examples, the wireless communications system 200 may implement aspects of the wireless communications system 100. For example, the wireless communications system may include a UE 115-a and a base station 105-a, which may be examples of corresponding devices described herein with reference to FIG. 1. In the wireless communications system 200, the base station 105-a may communicate with the UE 115-a over communication links 230-a and 230-b within a geographic coverage area 110-a of the base station 105-*a*. In some examples, the UE 115-*a* may determine an order for DCI messages that the base station 105-*a* transmits to the UE 115-*a*, where the order may be based on a starting symbol period or time period (e.g., a scheduling unit) of a downlink message (e.g., PDSCH, PDCCH) that includes a DCI message. The UE 115-*a* may use the order to determine whether the UE 115-*a* missed (e.g., unsuccessfully decoded) any of the DCI messages. As a result, the base station 105-*a* and the UE 115-*a* may communicate with improved reliability based on efficient techniques to identify missed DCI messages.

In wireless communications system 200, a base station 105 (e.g., the base station 105-*a*) may transmit DCI messages to a UE 115 (e.g., the UE 115-*a*) during a PMO. The UE 115 may perform a blind search of PDCCH resources in the PMO and may receive the DCI messages on the PDCCH resources. The DCI messages may indicate PDSCH resources on which the base station 105 is scheduled to transmit subsequent PDSCH transmissions (e.g., a downlink grant) and PUCCH resources on which the UE 115 may transmit a feedback message for the subsequent PDSCH transmissions (e.g., an uplink grant). Accordingly, the UE 115 may receive the subsequent PDSCH transmissions on the indicated PDSCH resources and may transmit a feedback message to the base station 105 on the indicated PUCCH resources. In some cases, the feedback message may include a codebook corresponding to the subsequent PDSCH transmissions.

The codebook may be determined based one or more PMOs, cDAI values, tDAI values, or a combination thereof, associated with the DCI messages. The one or more PMOs may include a union of PMOs across active downlink bandwidth parts (BWPs) of configured serving cells associated with the base station 105. These PMOs may be ordered in ascending order with respect to start times of search space sets associated with the PMOs. That is, the one or more PMOs may be based on a configuration of different search space sets associated with different serving cells of the base station 105. If two search space sets (e.g., of the same or different serving cells) have the same start time, the two search space sets may be associated with a single PMO.

In some cases, the UE 115 may receive a cDAI value, a tDAI value, or both in a DCI message. A cDAI value may indicate an accumulative number of resource pairs (e.g., serving cell-PMO pairs) in which the base station 105 has transmitted DCI messages, up to a current serving cell and a current PMO in which the base station 105 is transmitting DCI messages. In some aspects, a cDAI value may indicate a serving cell first and a PMO second. A tDAI value may indicate a total number of resource pairs in which the base station 105 has transmitted DCI messages, up to a current PMO in which the base station 105 is transmitting DCI messages. In some cases, the base station 105 may indicate a tDAI value in a DCI message if the base station 105 is using carrier aggregation (e.g., if the base station 105 is transmitting DCI messages via multiple serving cells). If the base station 105 is not using carrier aggregation, the base station 105 may not indicate a tDAI value in a DCI message. The base station may indicate the same tDAI value in all DCI messages that the base station 105 transmits to the UE 115 in a PMO, where indicating a tDAI value in DCI messages may decrease the likelihood of the UE 115 missing a DCI message corresponding to a last serving cell in a PMO. In some cases, the base station 105 may indicate a cDAI value, a tDAI value, or both in a DCI message based on using a modulo 4 operation. That is, the base station 105 may use two bits to indicate a cDAI value and two bits to indicate a tDAI value.

A DCI message may indicate a set of PDSCH resources on which the UE 115 may receive a subsequent PDSCH transmission from the base station 105. If the UE 115 successfully receives the DCI message, the UE 115 may place an ACK or a NACK corresponding to the subsequent PDSCH transmission in a codebook based on whether the UE 115 successfully receives the subsequent PDSCH transmission. In contrast, if the UE 115 misses (e.g., unsuccessfully receives or unsuccessfully decodes) a DCI message, the UE 115 may place a NACK in the codebook (e.g., in the same order as the DCI message) as a missed cDAI. The UE 115 may determine whether the UE 115 has missed a DCI message based on comparing consecutive cDAI values from other DCI messages that the UE 115 has successfully received. For example, if the UE receives DCI messages with cDAI values of 0, 1, and 3, the UE 115 may determine that the UE 115 missed a DCI message with a cDAI value of 2. The UE 115 may also determine whether the UE 115 missed a DCI message in a PMO based on comparing a tDAI value from successfully DCI messages in the PMO with cDAI values from the successfully received DCI messages. For example, if the UE 115 successfully receives a DCI message in a PMO and the successfully received DCI message indicates a tDAI value of 2, the UE 115 may determine that the UE 115 missed a DCI message if the UE 115 does not receive another DCI message in the PMO. In some cases, this may occur if the base station 105 transmits DCI messages in the same PMO via different serving cells.

The UE 115 may transmit HARQ-ACK feedback to the base station 105 for PDSCH transmissions scheduled by DCI messages (e.g., via a codebook). In some cases, the base station 105 may configure the UE 115 to transmit the HARQ-ACK feedback (e.g., via RRC signaling). For example, a UE 115 may support and be configured with a Type-2 HARQ-ACK feedback scheme, and a codebook may be used for HARQ-ACK construction (e.g., configuration) that includes cDAI and tDAI definitions as well as an ordering mechanism for DCI messages. This configuration may be based on a PMO in which the DCI messages are received.

For DCI messages indicating the same slot for PUCCH transmission, the UE 115 may determine PUCCH resources on which to transmit HARQ-ACK feedback based on ordering the DCI messages. Thus, in addition to determining cDAI definitions, tDAI definitions, and HARQ-ACK constructions based on ordering the DCI messages, the UE 115 may also use the order to determine PUCCH resources on which to transmit HARQ-ACK feedback. More specifically, the UE 115 may order the DCI messages and may identify a PUCCH resource indicator (PRI) in a last DCI message of the ordered DCI messages. The UE 115 may identify the last DCI message based on the determined order. In some cases, the order may be a function of PMOs in which the DCI messages were received. For example, the UE 115 may index the DCI messages (which may be associated with one or more detected DCI formats) in an ascending order across serving cell indices within the same PMO. The UE 115 may then index the DCI messages in ascending order across PMO indices. In some cases, this technique for determining PUCCH resources on which to transmit HARQ-ACK feedback (e.g., based on an ordering of DCI messages, and selecting a last DCI message from a set of DCI messages) may be applicable different HARQ-ACK codebook types (e.g., Type-1 codebooks, Type-3 codebooks).

In some cases, however, the base station 105 may transmit DCI messages to the UE 115 outside of a PMO. For example, the base station 105 may transmit a piggyback DCI message multiplexed with a PDSCH transmission on PDSCH resources that are outside a PMO. That is, the piggyback DCI message may not be associated with a PMO. As such, the UE 115 may be unable to use a PMO-based ordering mechanism on piggyback DCI messages. Moreover, these piggyback DCI messages may not include cDAI values or tDAI values because such values may be specific to DCI messages transmitted in PMOs. Thus, the UE 115 may be unable to order piggyback DCI messages received from the base station. The UE 115 may also be unable to determine if the UE 115 has missed a piggyback DCI message from the base station. As a result, the UE 115 may be unable to detect missed piggyback DCI messages or transmit HARQ-ACK feedback for missed piggyback DCI messages, thereby reducing the reliability of communications between the UE 115 and the base station 105.

In accordance with aspects of the present disclosure, the wireless communications system 200 may enable the UE 115-a to receive DCI messages (e.g., including piggyback DCI messages) from the base station 105-a with improved reliability based on using a modified ordering scheme for the piggyback DCI messages. For example, if the UE 115-a receives one or more piggyback DCI messages multiplexed with one or more PDSCH transmissions, each piggyback DCI message may include an indication of an order for the piggyback DCI message. The order may be based on a scheduling unit (e.g., a time period) associated with the multiplexed PDSCH transmission, a starting symbol of the multiplexed PDSCH transmission, a CC index of a PDSCH transmission scheduled by the piggyback DCI message, or a combination thereof. The UE 115-a may use this order to determine whether the UE 115-a has missed any piggyback DCI messages from the base station 105-a.

As an example, if the UE 115-a receives a first DCI message 210 multiplexed with a first PDSCH transmission 205 and a second DCI message 220 multiplexed with a second PDSCH transmission 215, the order for the first DCI message 210 and the second DCI message 220 may be based on scheduling units associated with the first PDSCH transmission 205 and the second PDSCH transmission 215, respective starting symbols of the first PDSCH transmission 205 and the second PDSCH transmission 215, CC indices of PDSCH transmissions scheduled by the first DCI message 210 and the second DCI message 220, or a combination thereof.

In some examples, the base station 105-a may configure the UE 115 with a scheduling unit (e.g., during RRC configuration) and may indicate, to the UE 115-a, an order for DCI messages that the base station 105-a is scheduled to transmit in the scheduling unit. For example, if the base station 105-a transmits the first DCI message 210 and the second DCI message 220 in the same scheduling unit, the base station 105-a may indicate an order for the first DCI message 210 and the second DCI message 220. Alternatively, If the base station 105-a transmits the first DCI message 210 and the second DCI message 220 in different scheduling units, the base station 105-b may indicate separate orders for the first DCI message 210 and the second DCI message 220. A scheduling unit, as described herein, may include a set of one or more time periods that are applied to grid of resources (e.g., a time/frequency resources grid), and each time period may include, for example, a slot, seven symbol periods (e.g., seven OFDM symbols), a set of symbol periods (e.g., a slot may include three scheduling units with varying numbers of symbols in each scheduling unit), one symbol period, or the like. In some examples, the scheduling unit may correspond to a time period during which a starting symbol of a transmission (e.g., a PDSCH transmission, a PDCCH transmission) occurs. A scheduling unit may correspond to other time periods that may be used to define an ordering of downlink transmissions, and the examples described herein should not be considered limiting to the scope covered by the claims or the disclosure.

The UE 115-a may transmit HARQ-ACK feedback 225 for PDSCH transmissions scheduled by piggyback DCI messages based on an order of the piggyback DCI messages. More specifically, the base station 105-a may configure the UE 115-a to transmit the HARQ-ACK feedback 225 in PUCCH resources indicated by a PRI field in a last piggyback DCI message of the order. For example, the UE 115-a may receive an indication of an order for the first DCI message 210 and the second DCI message 220 and may determine that the first DCI message 210 comes before the second DCI message 220 based on the order. Thus, the UE 115-a may transmit the HARQ-ACK feedback 225 on PUCCH resources indicated by a PRI field in the second DCI message 220 (e.g., because the second DCI message 220 is the last DCI message in the order). In some examples, the UE 115-a may transmit HARQ-ACK feedback for PDSCH transmissions scheduled by both the first DCI message 210 and the second DCI message 220 on the same PUCCH resources (e.g., in the same message, the same PUCCH opportunity).

FIGS. 3A and 3B illustrate examples of resource maps 300 and 301, respectively, that support feedback techniques for DCI on a PDSCH in accordance with aspects of the present disclosure. The resource maps 300 and 301 may implement or be implemented by aspects of the wireless communications system 100 and the wireless communications system 200. For example, the resource maps 300 and 301 may illustrate communications between a base station 105 and a UE 115, which may be examples of corresponding devices as described herein with reference to FIGS. 1 and 2. In accordance with the resource maps 300 and 301, a base station 105 may transmit one or more DCI messages to a UE 115 over one or more CCs 305.

In the example of FIG. 3A, a base station 105 may transmit one or more DCI messages to a UE 115 over a CC 305-a and a CC 305-b. The CC 305-a may have 2 PMOs per slot, whereas the CC 305-b may have 1 PMO per slot. As an example, the base station 105 may transmit a DCI message 315-a scheduling a PDSCH transmission 325-a and a DCI message 320-a scheduling a PDSCH transmission 330-a to the UE 115 in a PMO 310-a. The base station 105 may also transmit a DCI message 315-b scheduling a PDSCH transmission 325-b to the UE 115 in a PMO 310-b. Likewise, the base station 105 may transmit a DCI message 320-b scheduling a PDSCH transmission 330-b to the UE 115 in a PMO 310-c. Additionally, the base station 105 may transmit a DCI message 315-c scheduling a PDSCH transmission 325-c to the UE 115 in a PMO 310-d.

Each of the DCI messages may indicate a cDAI value and, in some cases, a tDAI value. As described with reference to FIG. 2, the cDAI value may indicate a cumulative number of DCI messages transmitted by the base station 105 (e.g., up to a current PMO), whereas the tDAI value may indicate a total number of DCI messages transmitted by the base station (e.g., up to a current PMO and a current serving cell). For example, the DCI message 315-a may indicate a cDAI value of 1 and a tDAI value of 2, the DCI message 320-a may indicate a cDAI value of 2 and a tDAI value of 2, the DCI message 315-*b* may indicate a cDAI value of 3 and a tDAI value of 3, the DCI message 320-*b* may indicate a cDAI value of 4 and a tDAI value of 4, and the DCI message 315-*c* may indicate a cDAI value of 5 and a tDAI value of 5. In some examples, the DCI message 315-*a* and the DCI message 320-*a* may indicate the same tDAI value (2) because both messages are transmitted in the same PMO (e.g., the PMO 310-*a*).

In some cases, the UE 115 may miss (e.g., unsuccessfully decode) one or more DCI messages from the base station 105. For example, the UE 115 may miss the DCI messages 320-*a* and 320-*b*. As a result, the UE 115 may be unable to receive the PDSCH transmissions 330-*a* and 330-*b* scheduled by the DCI messages 320-*a* and 320-*b*, respectively. In such cases, the UE 115 may determine that the DCI messages 320-*a* and 320-*b* have been missed based on the cDAI values and tDAI values of the DCI messages 315-*a*, 315-*b*, and 315-*c* (e.g., successfully received DCI messages). For example, the UE 115 may determine that the DCI message 320-*a* was missed based on identifying a missing value (e.g., a hole) between the tDAI value of the DCI message 315-*b* (3) and the tDAI value of the DCI message 315-*c* (5). That is, the UE 115 may determine that a downlink grant indicated by the DCI message 320-*b* that was unsuccessfully decoded. Similarly, the UE 115 may determine that the DCI message 320-*a* was missed based on the cDAI value and the tDAI value of the DCI message 315-*a*. For example, the UE 115 may determine that two DCI messages were transmitted in the PMO 310-*a* (e.g., based on the tDAI value of the DCI message 315-*a*) and that one DCI message was missed (e.g., because the UE 115 only received one DCI message in the PMO 310-*a*).

The UE 115 may transmit HARQ-ACK feedback via a PUCCH transmission 335 to the base station 105 for the PDSCH transmissions 325 and the PDSCH transmissions 330 scheduled by the DCI messages 315 and the DCI messages 320, respectively. In some examples, the HARQ-ACK feedback of the PUCCH transmission 335 may include a codebook with entries 340 (e.g., bits) corresponding to the PDSCH transmissions 325, 330. That is, the codebook may include a bit for each scheduled PDSCH transmission, and the PDSCH transmission may each be associated with feedback during a same PUCCH opportunity. For example, the codebook may include an entry 340-*a* corresponding to the PDSCH transmission 325-*a* scheduled by the DCI message 315-*a*, an entry 340-*b* corresponding to the PDSCH transmission 330-*a* scheduled by the DCI message 320-*a*, an entry 340-*c* corresponding to the PDSCH transmission 325-*b* scheduled by the DCI message 315-*b*, an entry 340-*d* corresponding to the PDSCH transmission 330-*b* scheduled by the DCI message 320-*b*, and an entry 340-*e* corresponding to the PDSCH transmission 325-*c* scheduled by the DCI message 315-*c*. As such, the entries 340 of the codebook may correspond to an ordering of the DCI messages transmitted to the UE. Here, the entries 340-*b* and 340-*d* may indicate a NACK for the PDSCH transmissions 330-*a* and 330-*b*, respectively, because the UE 115 missed the DCI messages 320-*a* and 320-*b*. The entries 340-*a*, 340-*c*, and 340-*e* may include either an ACK or a NACK based on whether the UE 115 is able to successfully decode the PDSCH transmissions 325-*a*, 325-*b*, and 325-*c*, respectively.

In the example of FIG. 3B, a base station 105 may transmit DCI messages 315 to a UE 115 over a CC 305-*c*. In contrast to the resource map 300, however, the base station 105 may transmit one or more of the DCI messages 315 on PDSCH resources. That is, the base station 105 may multiplex one or more of the DCI messages 315 with one or more PDSCH transmissions 325. In some cases, such multiplexed (e.g., piggyback) DCI messages 315 may be transmitted (e.g., by the base station 105) in higher frequency bands (e.g., from 52.6 GHz to 71 GHz). In some cases, multiplexing these DCI messages 315 with PDSCH transmissions 325 may implement mechanisms similar to those used to multiplex uplink control information (UCI) messages with physical uplink shared channel (PUSCH) transmissions.

As an example, the base station 105 may transmit a DCI message 315-*d* scheduling a PDSCH transmission 325-*d* to the UE 115 in a PMO 310-*e*. In some cases, the base station 105 may multiplex a DCI message 315-*e* scheduling a PDSCH transmission 325-*e* with the PDSCH transmission 325-*d* and may transmit the DCI message 315-*e* to the UE 115 on PDSCH resources associated with the PDSCH transmission 325-*d*. In some cases, the DCI message 315-*e* and the PDSCH transmission 325-*d* (which may include a transport block) may be encoded separately but transmitted together. The UE 115 may receive the PDSCH transmission 325-*e* based on the DCI message 315-*e*. In some cases, the PDSCH transmission 325-*e* may be transmitted (e.g., multiplexed) with a DCI message 315-*f* scheduling a PDSCH transmission 325-*f*. That is, a grant for the PDSCH transmission 325-*f* may be transmitted as part of the PDSCH transmission 325-*e*. The UE 115 may receive the PDSCH transmission 325-*f* based on the DCI message 315-*f*.

Multiplexing one or more DCI messages 315 with one or more PDSCH transmissions 325 may enable the base station 105 to transmit such DCI messages 315 with improved efficiency. For example, the base station 105 may use a higher modulation order and a reduced number of PDSCH demodulation reference signals (DMRS) to transmit the multiplexed DCI messages 315, which may decrease a processing overhead at the base station 105. Additionally, a UE 115 receiving such multiplexed DCI messages 315 may consume less power than performing blind PDCCH searches for DCI messages in PMOs 310.

In some cases, however, the DCI messages 315-*e* and 315-*f* (e.g., multiplexed DCI messages 315) may not indicate a cDAI value or a tDAI value because these DCI messages 315 may not be associated with a PMO. In addition, when the cDAI and tDAI values do not account for DCI messages received outside of a PMO (e.g., when the cDAI and/or tDAI values are based on a PMO), the cDAI and tDAI values may not increment when one or more multiplexed DCI messages 315 are transmitted. As such, the UE 115 may be unable to determine whether the UE 115 missed any of the multiplexed DCI messages 315. In turn, if the UE 115 misses a multiplexed DCI message 315, the UE 115 may be unable to transmit HARQ-ACK feedback for a PDSCH transmission 325 scheduled by the missed DCI message 315.

In accordance with the techniques described herein, the UE 115 may receive such multiplexed DCI messages 315 with improved reliability based on determining an order for the multiplexed DCI messages 315, where the order may be based on a time period (e.g., an OFDM symbol or a scheduling unit, or both) during which a PDSCH transmission 325 (e.g., that is multiplexed with a DCI message 315) starts. For example, the DCI messages 315-*e* and 315-*f* may include an indication of an order based on scheduling units associated with the PDSCH transmissions 325-*d* and 325-*e* (e.g., PDSCH transmissions multiplexed with the DCI messages 315-*e* and 315-*f*), starting symbols of the PDSCH transmissions 325-*d* and 325-*e*, CC indices of the PDSCH transmissions 325-*e* and 325-*f* (e.g., PDSCH transmissions scheduled by the DCI messages 315-*e* and 315-*f*), or a combination thereof. The UE 115 may use this order to determine whether the UE 115 missed any multiplexed DCI messages 315 from the base station 105.

Figure 4:
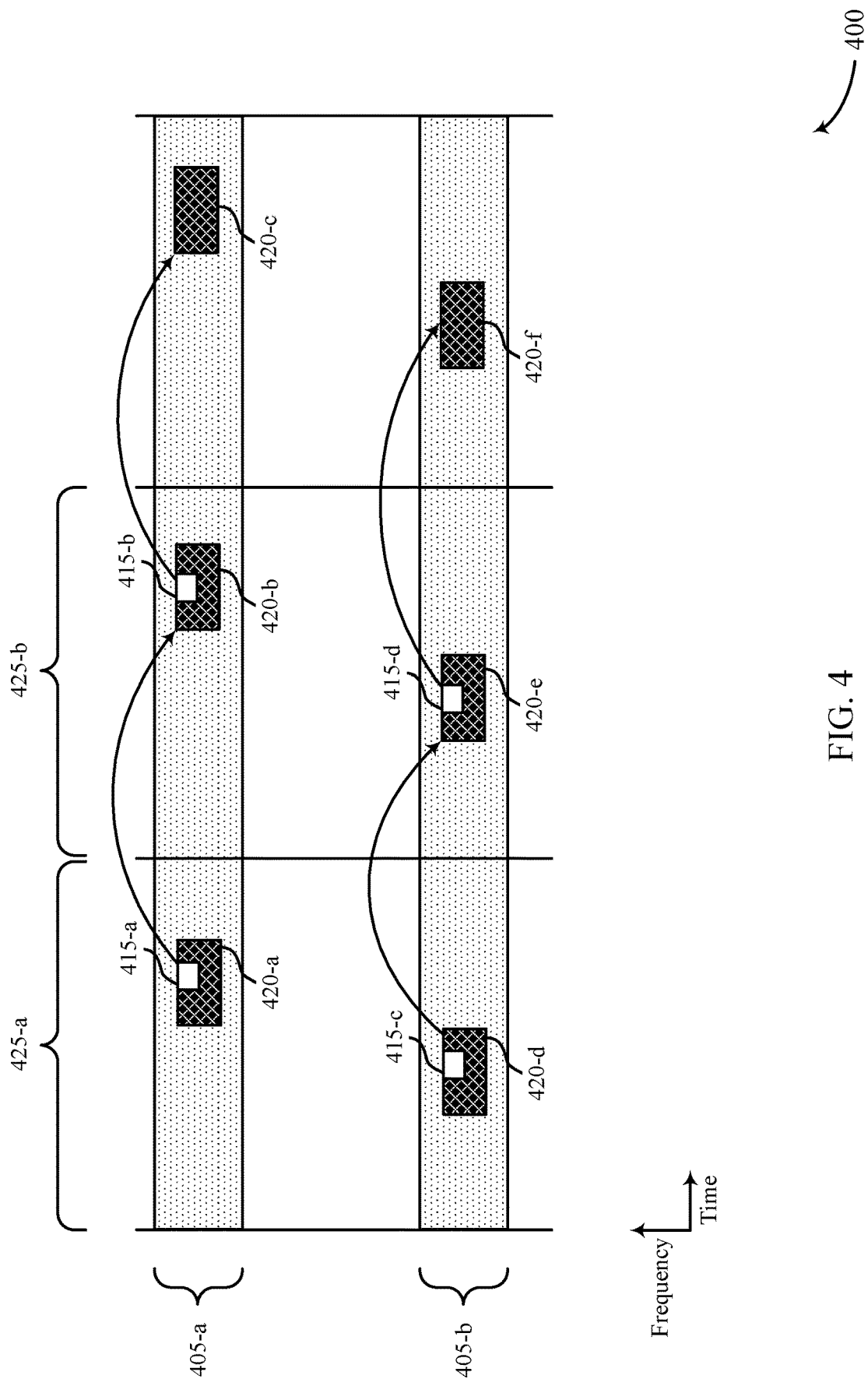

FIG. 4 illustrates an example of a resource map 400 that supports feedback techniques for DCI on a PDSCH in accordance with aspects of the present disclosure. The resource map 400 may implement or be implemented by aspects of the wireless communications system 100 and the wireless communications system 200. For example, the resource map 400 may illustrate communications between a base station 105 and a UE 115, which may be examples of corresponding devices described herein with reference to FIGS. 1 and 2. In accordance with the resource map 400, the base station may transmit DCI messages 415 multiplexed with PDSCH transmissions 420. In some examples, the base station 105 may transmit the DCI messages 415 in different scheduling units 425, on different CCs 405, or both. The multiplexed DCI messages 415 may indicate an order based on scheduling units associated with the multiplexed PDSCH transmissions 420, starting symbols of the multiplexed PDSCH transmissions 420, or CC indices of PDSCH transmissions 420 scheduled by the multiplexed DCI messages 415.

Some of the PDSCH transmissions 420 may be multiplexed with DCI messages 415 (e.g., piggyback DCI messages) scheduling subsequent PDSCH transmissions 420. For example, a PDSCH transmission 420-*a* may be multiplexed with a DCI message 415-*a* scheduling a PDSCH transmission 420-*b*, the PDSCH transmission 420-*b* may be multiplexed with a DCI message 415-*b* scheduling a PDSCH transmission 420-*c*, a PDSCH transmission 420-*d* may be multiplexed with a DCI message 415-*c* scheduling a PDSCH transmission 420-*e*, and the PDSCH transmission 420-*e* may be multiplexed with a DCI message 415-*d* scheduling a PDSCH transmission 420-*f*.

In some examples, the DCI messages 415 may be ordered (e.g., in ascending order) based on starting symbols of the PDSCH transmissions 420 with which the DCI messages 415 are multiplexed. For example, the DCI message 415-*a* may be ordered based on a starting symbol (S) of the PDSCH transmission 420-*a*. In some examples, a number of starting symbols may correspond to a number of DCI messages 415, which may be dynamic (e.g., not fixed for a period of time). In such examples, the DCI message 415-*c* may be ordered first because a starting symbol of the PDSCH transmission 420-*d* with which the DCI message 415-*c* is multiplexed comes before starting symbols of other PDSCH transmissions 420. Accordingly, the DCI message 415-*a* may be ordered after the DCI message 415-*c*, the DCI message 415-*d* may be ordered after the DCI message 415-*a*, and the DCI message 415-*b* may be ordered after the DCI message 415-*d*.

In some other examples, the base station 105 (or another network entity) may define a fixed time grid that includes a number of symbols. This fixed time grid may define one or more scheduling units 425. DCI messages 415 multiplexed with PDSCH transmissions 420 may belong to scheduling units 425 in which starting symbols of the multiplexed PDSCH transmissions 420 are located. For example, the DCI message 415-*b* may belong to the scheduling unit 425-*b* because a starting symbol of the PDSCH transmission 420-*b* (with which the DCI message 415-*b* is multiplexed) is located in the scheduling unit 425-*b*. Likewise, the DCI message 415-*a* may belong to the scheduling unit 425-*a*. If, for example, the PDSCH transmission 420-*a* crosses a boundary of the scheduling unit 425-*a*, the DCI message 415-*a* may still belong to the scheduling unit 425-*a* because the starting symbol of the PDSCH transmission 420-*a* is located in the scheduling unit 425-*a*. In some examples, each of the scheduling units 425 may include a slot (e.g., 1 scheduling unit in a slot) or 7 symbols (e.g., 2 scheduling units 425 in a slot). In some other examples, a slot may include three scheduling units 425, which may have lengths of four symbols, four symbols, and six symbols, respectively. Ordering DCI messages 415 based on starting symbols of PDSCH transmissions 420 with which the DCI messages 415 are multiplexed may be an example of ordering DCI messages 415 based on the scheduling units 425 in which starting symbols of the multiplexed PDSCH transmissions 420 are located (e.g., using scheduling units with a length of 1 symbol).

Additionally or alternatively, the DCI messages 415 multiplexed with PDSCH transmissions 420 may be ordered (e.g., in ascending order) based on scheduled CC (e.g., serving cell) indices associated with the DCI messages 415. Unlike starting symbols and scheduling units, which may be determined from PDSCH transmissions 420 with which the DCI messages 415 are multiplexed, scheduled CC indices may refer to CC indices of PDSCH transmissions 420 scheduled by the DCI messages 415, which may be different from CC indices of the multiplexed PDSCH transmissions 420. In some examples (e.g., in the example of self-scheduling), CC indices of PDSCH transmissions 420 scheduled by the DCI messages 415 may be the same as CC indices of the multiplexed PDSCH transmissions 420. Alternatively (e.g., in the example of cross-carrier scheduling), these CC indices may be different. FIG. 4 may illustrate an example of self-scheduling (e.g., no cross-carrier scheduling), but it is to be understood that the resource map 400 may employ any number of alternative scheduling techniques (e.g., including cross-carrier scheduling). In some examples, if different CCs 405 are associated with different subcarrier spacings (SCSs), symbol durations corresponding to these CCs 405 may be different. In such examples, starting symbols and scheduling units 425 associated with PDSCH transmissions 420 on the different CCs 405 may be defined as a symbol duration corresponding to a CC with a threshold SCS (e.g., the highest SCS, the lowest SCS) such that scheduling units 425 have a length that is substantially equivalent across CCs 405 in a PUCCH group (e.g., across downlink CCs 405 with ACKs or NACKs multiplexed in the same PUCCH cell). In the example of FIG. 4, CCs 405-*a* and 405-*b* may have the same SCS, but it is to be understood that these CCs 405 may also have different SCSs.

As an example, if the CCs 405 have the same SCS and DCI messages 415 within a scheduling unit 425 are ordered according to their corresponding scheduled CC indices, the DCI message 415-*a* may be ordered first because the PDSCH transmission 420-*a* with which the DCI message 415-*a* is multiplexed belongs to the earliest scheduling unit 425 (e.g., the scheduling unit 425-*a*) and the scheduled CC index of the DCI message 415-*a* (e.g., the CC index of the PDSCH transmission 420-*b* scheduled by the DCI message 415-*a*) is higher than the scheduled CC index of the DCI message 415-*c*. Accordingly, the DCI message 415-*c* may be ordered after the DCI message 415-*a*, the DCI message 415-*b* may be ordered after the DCI message 415-*b*, and the DCI message 415-*d* may be ordered after the DCI message 415-*b*. In some examples, the CC index of a scheduled PDSCH transmission 420 may be used when two or more PDSCH transmissions 420 share a same scheduling unit 425 (e.g., a beginning symbol period of each PDSCH transmission are included in the same scheduling unit 425). In such cases, the ordering based on a beginning symbol period of the PDSCH transmissions may not be used for determining the order, as the ordering may be based on the CC index. In other examples, the ordering may be based on the ordering (e.g., in the time domain) of the beginning symbol periods or the scheduling units of the PDSCH transmissions 420 irrespective of the scheduled CC index (e.g., the carrier index may be used when the starting symbol (or scheduling) unit is the same between PDSCH transmissions 420).

The UE 115 may transmit a HARQ-ACK codebook to the base station 105 on PUCCH resources indicated by a last DCI message in the order. In some examples, the HARQ-ACK codebook may be an example of a Type-2 HARQ-ACK codebook. The HARQ-ACK codebook may be based on cDAI values, tDAI values, or both that correspond to the DCI messages 415. For example, in accordance with the techniques described herein, a cDAI value may be defined as a cumulative number of resource pairs (e.g., pairs of serving cells and scheduling units 425) in which the base station 105 has transmitted DCI messages 415 (e.g., up to a current CC index and a current scheduling unit). Likewise, a tDAI value may be defined as a total number of resource pairs in which the base station 105 has transmitted DCI messages 415 (e.g., up to a current scheduling unit). In some examples, a tDAI value may be different in different scheduling units 425. However, a tDAI value may be the same for all DCI messages 415 in the same scheduling unit. The UE 115 may order the DCI messages 415 based on these cDAI and tDAI values. After ordering the DCI messages 415, if the UE 115 detects one or more missing values (e.g., holes) in the modified cDAI and tDAI values (e.g., corresponding to one or more missing DCI messages), the UE 115 may generate a NACK for the missing DCI messages in the HARQ-ACK codebook.

The UE 115 may determine a set of PUCCH resources on which to transmit HARQ-ACK feedback based on a PRI field in a last DCI message (e.g., among the DCI messages 415 indicating a same slot for PUCCH transmission). The UE 115 may identify the last DCI message based on the determined order of the DCI messages 415. In some examples, this method of determining PUCCH resources may be applicable to all HARQ-ACK codebook types.

In some examples, the determined order may account for DCI messages transmitted in PMOs as well as piggyback DCI messages. In such cases, when the base station 105 transmits one or more DCIs in PMOs and one or more piggyback DCI messages, the UE 115 may apply similar ordering techniques to both DCI message types. That is, the UE 115 may order DCI messages received in PMOs and piggyback DCI messages using similar criteria. For example, if the UE 115 receives the DCI message 415-a multiplexed with the PDSCH transmission 420-a and receives another DCI in a PMO, the UE may order the DCI message 415-a and the other DCI message based on a starting symbol of the PDSCH transmission 420-a and a starting symbol of the PMO. More specifically, the starting symbol of the PMO may determine a scheduling unit to which the other DCI message belongs. Accordingly, the UE 115 may compare the scheduling unit of the other DCI message to the scheduling unit 425-a of the DCI message 415-a. In this way, DCI messages in PMOs may be ordered with piggyback DCI messages based on the scheduling units to which each DCI message belongs.

In some other examples, DCI messages in PMOs may be ordered separately from piggyback DCI messages. That is, a counting process (e.g., an accumulation process indicated by cDAI and tDAI values) of DCI messages in PMOs may be separate from a counting process of piggyback DCI messages. In such examples, the UE 115 may transmit a HARQ-ACK codebook that includes two sub-codebooks corresponding to PDSCH transmissions scheduled by DCI messages in PMOs and PDSCH transmissions scheduled by piggyback DCI messages, respectively. In such examples, PUCCH resource determination may be based on a PRI field of a last DCI message among DCI messages in PMOs, a PRI field of a last DCI message among piggyback DCI messages, or a PRI field of a last DCI message among all DCI messages (e.g., DCI messages in PMOs and piggyback DCI messages).

In some examples, the base station 105 may configure the UE 115 with an ordering mechanism via RRC signaling. For example, the base station 105 may configure the UE 115 with an ordering mechanism based on starting symbols. As such, the UE 115 may use the ordering mechanism to order DCI messages from the base station 105 according to their respective starting symbols (e.g., the starting symbols of PDSCH transmissions with which the DCI messages are multiplexed or the starting symbols of PMOs in which the DCI messages are transmitted). In some other examples, the base station 105 may configure the UE 115 with different ordering mechanisms (e.g., based on starting symbols, scheduling units, scheduled CC indices, modified cDAI and tDAI values) via RRC signaling and may dynamically indicate (e.g., via a subsequent DCI message) a specific ordering mechanism of the preconfigured ordering mechanisms. Additionally or alternatively, the base station 105 may configure the UE 115 with an ordering mechanism based on capabilities of the UE 115. For example, the UE 115 may indicate, to the base station 105 (e.g., during RRC configuration), one or more ordering mechanisms supported by the UE 115. Accordingly, the base station 105 may configure the UE 115 with one of the indicated ordering mechanisms.

Figure 5:
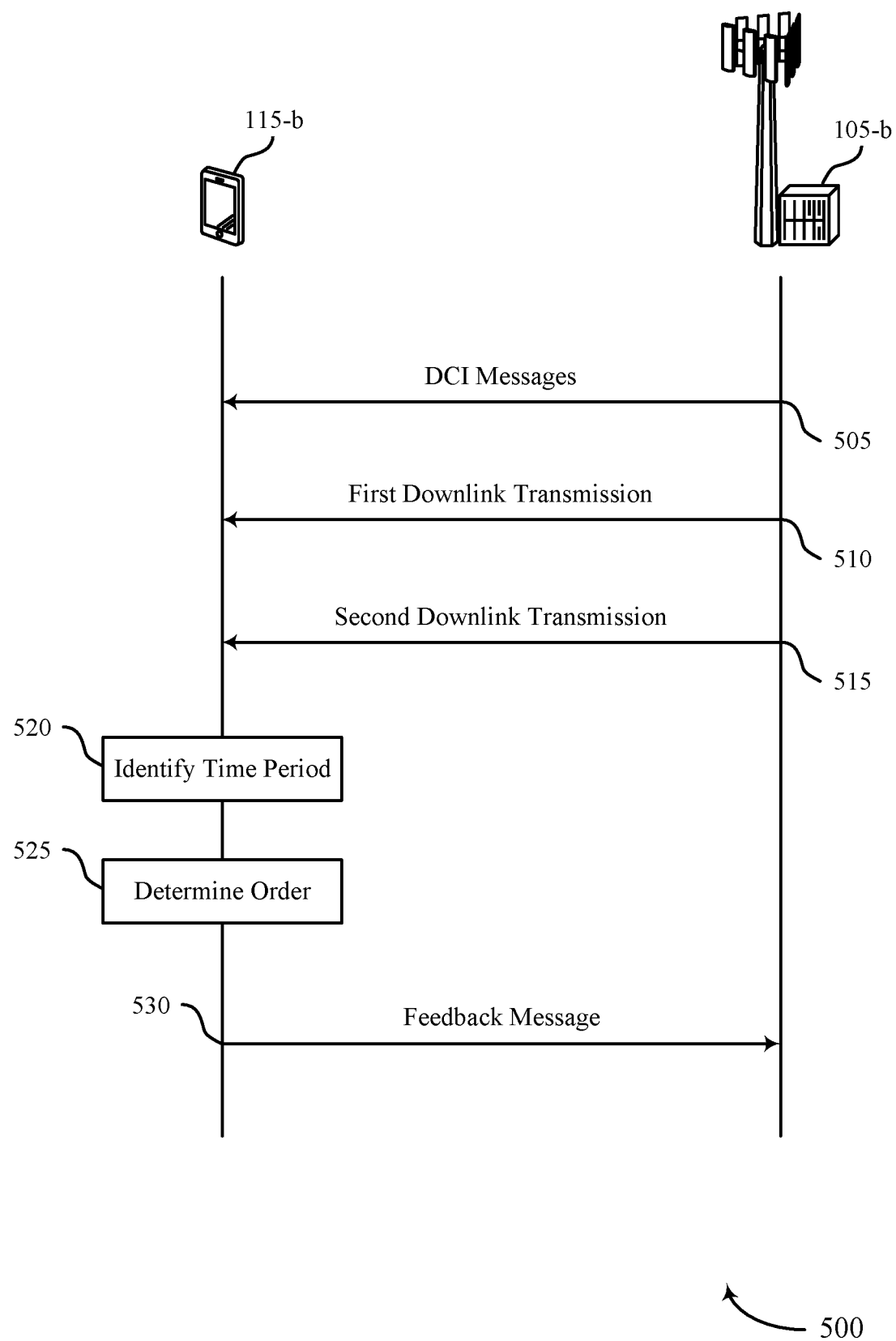
FIG. 5 illustrates an example of a process flow in a system that supports feedback techniques for DCI on a PDSCH in accordance with aspects of the present disclosure.

FIG. 5 illustrates an example of a process flow 500 that supports feedback techniques for DCI on a PDSCH in accordance with aspects of the present disclosure. In some examples, the process flow 500 may implement or be implemented by aspects of the wireless communications system 100 and the wireless communications system 200. For example, the process flow 500 may illustrate communications between a base station 105-b and a UE 115-b, which may be examples of corresponding devices described herein with reference to FIGS. 1 and 2. In the following description of the process flow 500, operations between the base station 105-b and the UE 115-b may be performed in a different order or at a different time than as shown. Some operations may also be omitted from the process flow 500, and other operations may be added to the process flow 500.

At 505, the base station 105-b may transmit DCI messages to the UE 115-b. Each of the DCI messages may schedule a respective downlink transmission (e.g., a PDSCH transmission) from the base station 105-b. The base station 105-b may multiplex one or more of the DCI messages with one or more downlink transmissions. For example, the base station 105-b may multiplex a first DCI message and a second DCI message with a first downlink transmission and a second downlink transmission, respectively. In some examples, the base station 105-b may transmit one or more of the DCI messages to the UE 115-b in a PMO. For example, the base station 105-b may transmit a third DCI message and a fourth DCI message to the UE 115-b in a first PMO and a second PMO, respectively.

At 510, the base station 105-b may multiplex a first DCI message with a first downlink transmission and may transmit both the first DCI message and the first downlink transmission to the UE 115-b on a first set of PDSCH resources. The first DCI message may indicate a second downlink transmission that the base station 105-b is scheduled to transmit after the first downlink transmission. Additionally or alternatively, the first DCI message may indicate a third downlink transmission that the base station 105-b is scheduled to transmit after the first downlink transmission. The third downlink transmission may be associated with a first carrier index value. The base station 105-b may transmit the first and third downlink transmissions on the same CC or on different CCs.

At 515, the base station may multiplex a second DCI message with the second downlink transmission and may transmit both the second DCI message and the second downlink transmission to the UE 115-b on a second set of PDSCH resources. The second DCI message may indicate a fourth downlink transmission that the base station 105-b is scheduled to transmit after the second downlink transmission. The fourth downlink transmission may be associated with a second carrier index value. The base station 105-b may transmit the second and fourth downlink transmissions on the same CC or on different CCs.

At 520, the UE 115-b may identify time periods corresponding to the first and second downlink transmissions. For example, the UE 115-b may identify a first symbol period corresponding to a beginning of the first downlink transmission and a second symbol period corresponding to a beginning of the second downlink transmission. In some examples, the first and second symbol periods may be within a scheduling unit that includes a set of one or more symbol periods. The scheduling unit may include a slot, a set of seven symbol periods within a slot, a set of four symbol periods within a slot, a set of six symbol periods in a slot, or a single symbol period. In some examples, a duration of the set of one or more symbol periods or a duration of the scheduling unit may be based on a symbol duration of a CC that has a threshold SCS.

At 525, the UE 115-b may determine an order for the first and second DCI messages based on the time periods corresponding to the first and second downlink transmissions. For example, the UE 115-b may determine the order based on comparing the first symbol period corresponding to the beginning of the first downlink transmission and the second symbol period corresponding to the beginning of the second downlink transmission. If, for example, the first symbol period is before the second symbol period, the UE 115-b may determine that the first DCI message is ordered before the second DCI message. In some examples, the UE 115-b may determine the order of the first and second DCI messages based on comparing the first and second scheduling units in which the first and second symbol periods are located. Additionally or alternatively, the UE 115-b may determine the order of the first and second DCI messages based on comparing the first and second carrier index values associated with the third and fourth downlink transmissions indicated by the first and second DCI messages, respectively.

In some examples, the UE 115-b may determine a second order for the first, second, third, and fourth DCI messages based on the first and second scheduling units corresponding to the first and second DCI messages and the first and second PMOs corresponding to the third and fourth DCI messages. More specifically, the UE 115-b may determine the second order based comparing the first and second symbol periods associated with the first and second DCI messages with a third symbol period associated with a beginning of the first PMO and a fourth symbol period associated with a beginning of the second PMO. Alternatively, the UE 115-b may determine a first order for the first and second DCI messages and a second order for the third and fourth DCI messages. That is, the UE 115-b may determine two separate orders for the DCI messages, where the first order corresponds to DCI messages multiplexed with downlink transmissions and the second order corresponds to DCI messages transmitted in PMOs.

In some examples, the UE 115-b may determine an order for cDAI values of the first and second DCI messages based on an accumulative number of resource pairs in which the base station 105-b has transmitted DCI messages up to a specific scheduled carrier index, a specific scheduling unit, or both. Each resource pair of the accumulative number of resource pairs may include a serving cell and a scheduling unit with one or more symbol periods. In some examples, the UE 115-b may generate a codebook based on the cDAI values and the order for the respective cDAI values.

Additionally or alternatively, the UE 115-b may determine an order for tDAI values of the first and second DCI messages based on a number of resource pairs in which the base station 105-b has transmitted DCI messages up to a specific scheduling unit. Each resource pair of the number of resource pairs may include a serving cell and a scheduling unit with one or more symbol periods. In some examples, the UE 115-b may generate a codebook based on the tDAI values and the order for the respective tDAI values. In some examples, the UE 115-b may update the tDAI values based on receiving other DCI messages in different scheduling units.

In some examples, the UE 115-b may identify a last DCI message from the first and second DCI messages based on the order of the first and second DCI messages. Additionally or alternatively, the UE 115-b may identify the last DCI message from any of the first, second, third or fourth DCI messages based on the second order. The UE 115-b may identify a set of uplink resources (e.g., PUCCH resources) associated with a transmission occasion based on a resource indicator field (e.g., a PRI) in the last DCI message.

At 530, the UE 115-b may transmit a feedback message for both the first downlink transmission and the second downlink transmission in the transmission occasion associated with the set of uplink resources. The UE 115-b may transmit the feedback message based on the order of the DCI messages. In some examples, the feedback message may include codebooks generated based on the cDAI values, the order of the cDAI values, the tDAI values, the order of the tDAI values, or a combination thereof. In some examples, if the UE 115-b receives other DCI messages from the base station 105-b in different scheduling units, the codebooks included in the feedback message may be based on an updated tDAI value. In some examples, if the UE 115-b determines a first order for the first and second DCI messages and a second order for the third and fourth DCI messages, the feedback message may include a first sub-codebook corresponding to the first and second DCI messages as well as a second sub-codebook corresponding to the third and fourth DCI messages.

Figure 6:
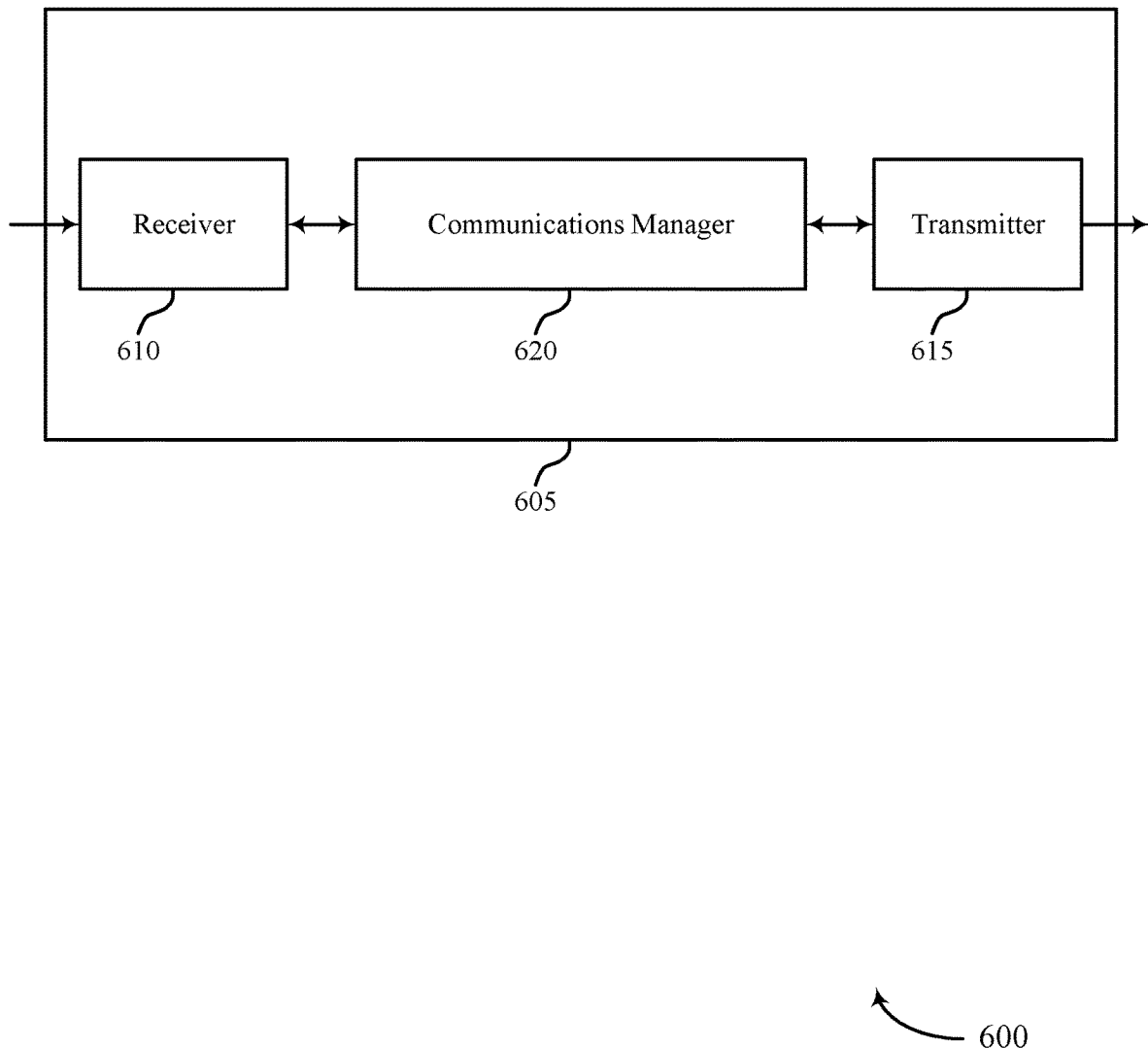
FIGS. 6 and 7 show block diagrams of devices that support feedback techniques for DCI on a PDSCH in accordance with aspects of the present disclosure.

FIG. 6 shows a block diagram 600 of a device 605 that supports feedback techniques for DCI on a PDSCH in accordance with aspects of the present disclosure. The device 605 may be an example of aspects of a UE 115 as described herein. The device 605 may include a receiver 610, a transmitter 615, and a communications manager 620.

The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to feedback techniques for DCI on a PDSCH). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to feedback techniques for DCI on a PDSCH). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of feedback techniques for DCI on a PDSCH as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. For example, the communications manager 620 may be configured as or otherwise support a means for receiving two or more DCI messages that each schedule respective downlink transmissions, where at least one DCI message of the two or more DCI messages is multiplexed with a downlink transmission and schedules an additional downlink transmission that is after the downlink transmission, and where a feedback message for the respective downlink transmissions is to be transmitted during a same transmission occasion. The communications manager 620 may be configured as or otherwise support a means for identifying, for each downlink transmission that is multiplexed with a DCI message, a time period including a beginning of the downlink transmission. The communications manager 620 may be configured as or otherwise support a means for determining an order of the two or more DCI messages based on the time period including the beginning of the downlink transmission. The communications manager 620 may be configured as or otherwise support a means for transmitting, during the same transmission occasion, the feedback message for the respective downlink transmissions scheduled by the two or more DCI messages, where the feedback message is based on the order of the two or more DCI messages.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for reduced power consumption and more efficient utilization of communication resources based on determining an order for DCI messages that are transmitted on PDSCH resources. For example, in comparison to receiving a DCI message based on performing a blind decoding procedure, the device 605 may implement the techniques described herein to receive a DCI message on PDSCH resources using fewer resources and higher modulation orders without reducing the reliability of the DCI message. As a result, the device 605 may consume less power while receiving the DCI message.

Figure 7:
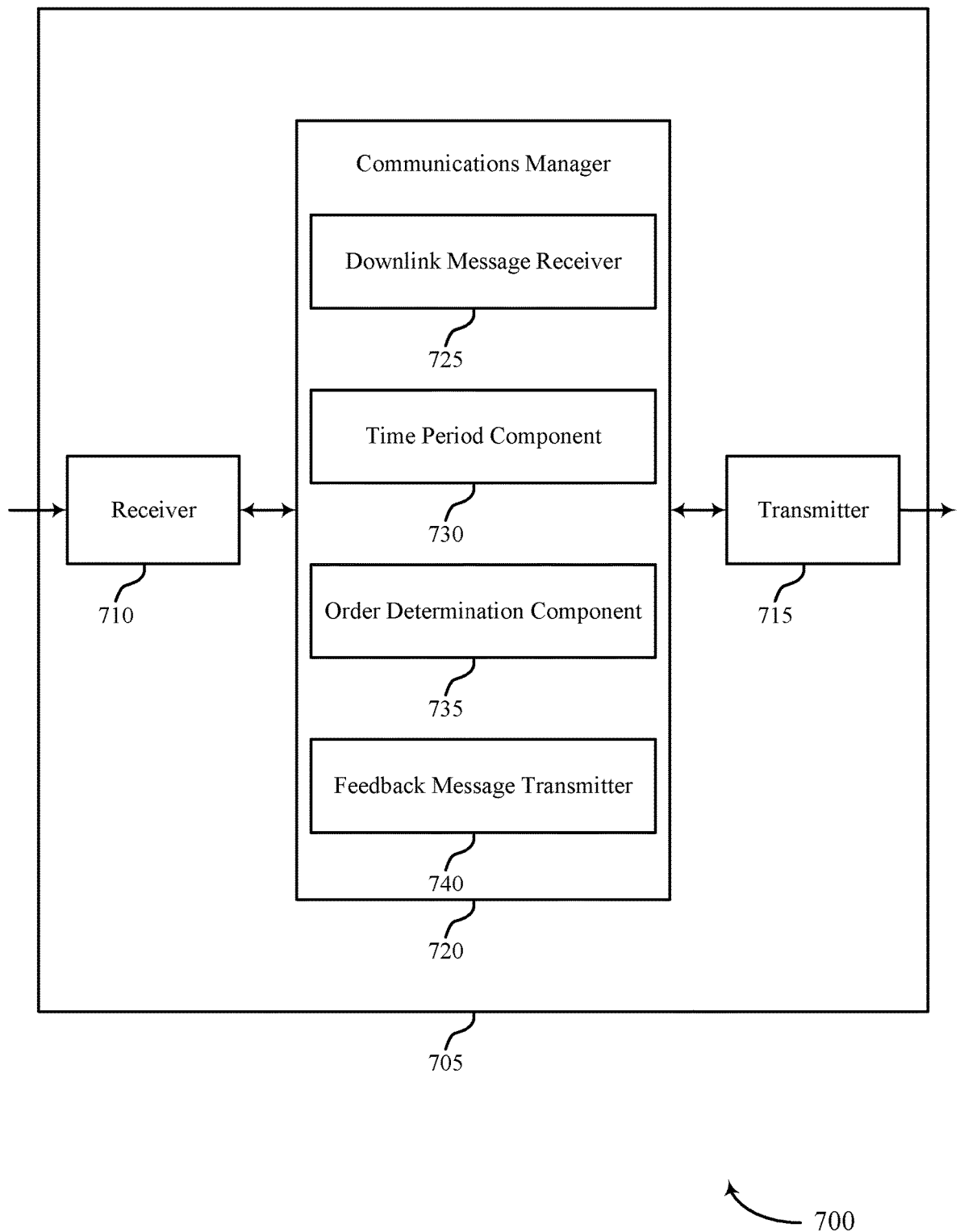

FIG. 7 shows a block diagram 700 of a device 705 that supports feedback techniques for DCI on a PDSCH in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to feedback techniques for DCI on a PDSCH). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to feedback techniques for DCI on a PDSCH). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of feedback techniques for DCI on a PDSCH as described herein. For example, the communications manager 720 may include a downlink message receiver 725, a time period component 730, an order determination component 735, a feedback message transmitter 740, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. The downlink message receiver 725 may be configured as or otherwise support a means for receiving two or more DCI messages that each schedule respective downlink transmissions, where at least one DCI message of the two or more DCI messages is multiplexed with a downlink transmission and schedules an additional downlink transmission that is after the downlink transmission, and where a feedback message for the respective downlink transmissions is to be transmitted during a same transmission occasion. The time period component 730 may be configured as or otherwise support a means for identifying, for each downlink transmission that is multiplexed with a DCI message, a time period including a beginning of the downlink transmission. The order determination component 735 may be configured as or otherwise support a means for determining an order of the two or more DCI messages based on the time period including the beginning of the downlink transmission. The feedback message transmitter 740 may be configured as or otherwise support a means for transmitting, during the same transmission occasion, the feedback message for the respective downlink transmissions scheduled by the two or more DCI messages, where the feedback message is based on the order of the two or more DCI messages.

Figure 8:
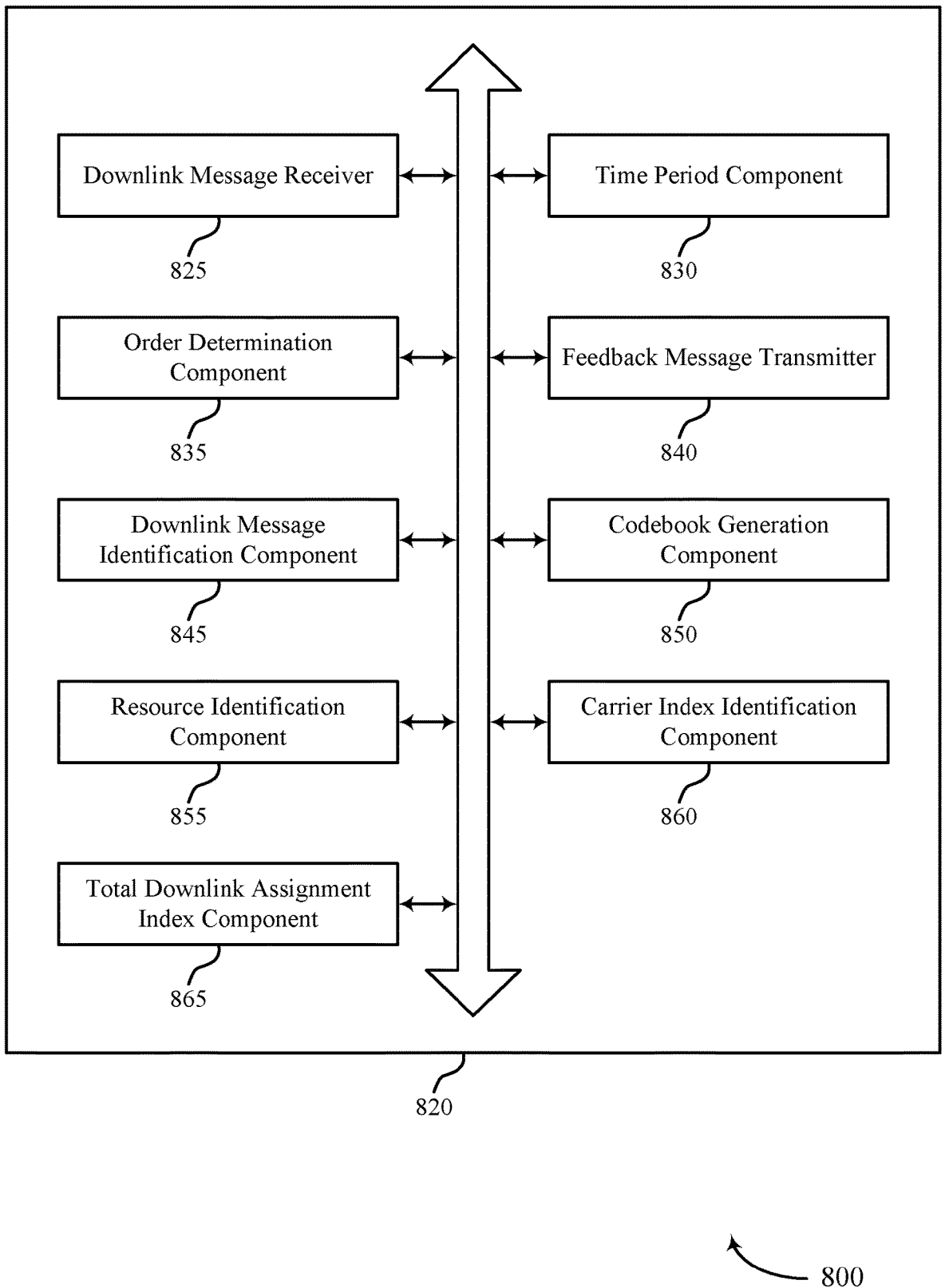
FIG. 8 shows a block diagram of a communications manager that supports feedback techniques for DCI on a PDSCH in accordance with aspects of the present disclosure.

FIG. 8 shows a block diagram 800 of a communications manager 820 that supports feedback techniques for DCI on a PDSCH in accordance with aspects of the present disclosure. The communications manager 820 may be an example of aspects of a communications manager 620, a communications manager 720, or both, as described herein. The communications manager 820, or various components thereof, may be an example of means for performing various aspects of feedback techniques for DCI on a PDSCH as described herein. For example, the communications manager 820 may include a downlink message receiver 825, a time period component 830, an order determination component 835, a feedback message transmitter 840, a downlink message identification component 845, a codebook generation component 850, a resource identification component 855, a carrier index identification component 860, a total downlink assignment index component 865, or any combination thereof. Each of these components may communicate, directly or indirectly, with one another (e.g., via one or more buses).

The communications manager 820 may support wireless communication at a UE in accordance with examples as disclosed herein. The downlink message receiver 825 may be configured as or otherwise support a means for receiving two or more DCI messages that each schedule respective downlink transmissions, where at least one DCI message of the two or more DCI messages is multiplexed with a downlink transmission and schedules an additional downlink transmission that is after the downlink transmission, and where a feedback message for the respective downlink transmissions is to be transmitted during a same transmission occasion. The time period component 830 may be configured as or otherwise support a means for identifying, for each downlink transmission that is multiplexed with a DCI message, a time period including a beginning of the downlink transmission. The order determination component 835 may be configured as or otherwise support a means for determining an order of the two or more DCI messages based on the time period including the beginning of the downlink transmission. The feedback message transmitter 840 may be configured as or otherwise support a means for transmitting, during the same transmission occasion, the feedback message for the respective downlink transmissions scheduled by the two or more DCI messages, where the feedback message is based on the order of the two or more DCI messages.

In some examples, to support determining the order of the two or more DCI messages, the downlink message identification component 845 may be configured as or otherwise support a means for identifying a first downlink transmission that is multiplexed with a first DCI message of the two or more DCI messages, where a first symbol period includes a beginning of the first downlink transmission. In some examples, to support determining the order of the two or more DCI messages, the downlink message identification component 845 may be configured as or otherwise support a means for identifying a second downlink transmission multiplexed with a second DCI message of the two or more DCI messages, where a second symbol period that is different from the first symbol period includes a beginning of the second downlink transmission. In some examples, to support determining the order of the two or more DCI messages, the order determination component 835 may be configured as or otherwise support a means for determining an order of the first DCI message and the second DCI message based on an order of the first symbol period and the second symbol period.

In some examples, the first symbol period is before the second symbol period, and the order determination component 835 may be configured as or otherwise support a means for determining that the first DCI message is ordered before the second DCI message based on the first symbol period being before the second symbol period.

In some examples, the first symbol period is within a first scheduling unit including a first set of one or more symbol periods and the second symbol period is within a second scheduling unit including a second set of one or more symbol periods, and the order determination component 835 may be configured as or otherwise support a means for determining the order of the first DCI message and the second DCI message based on an order of the first scheduling unit and the second scheduling unit.

In some examples, one or both of the first scheduling unit or the second scheduling unit includes at least one of a slot, a set of seven symbol periods within a slot, a set of four symbol periods within a slot, a set of six symbol periods in a slot, or a single symbol period.

In some examples, to support determining the order of the two or more DCI messages, the carrier index identification component 860 may be configured as or otherwise support a means for identifying a first carrier index value associated with a third downlink transmission scheduled by the first DCI message, where the first symbol period is within a scheduling unit including a set of one or more symbol periods. In some examples, to support determining the order of the two or more DCI messages, the carrier index identification component 860 may be configured as or otherwise support a means for identifying a second carrier index value associated with a fourth downlink transmission that is scheduled by the second DCI message, where the second symbol period is within the scheduling unit. In some examples, to support determining the order of the two or more DCI messages, the order determination component 835 may be configured as or otherwise support a means for determining the order of the first DCI message and the second DCI message based on an order of the first carrier index value and the second carrier index value.

In some examples, the first carrier index value is less than the second carrier index value and the first symbol period is after the second symbol period within the scheduling unit, and the order determination component 835 may be configured as or otherwise support a means for determining that the second DCI message is ordered before the first DCI message based on the first symbol period being after the second symbol period.

In some examples, the first carrier index value is less than the second carrier index value and the first symbol period is before the second symbol period within the scheduling unit, and the order determination component 835 may be configured as or otherwise support a means for determining that the first DCI message is ordered before the second DCI message based on the first carrier index value being less than the second carrier index value and the first symbol period and the second symbol period being within the scheduling unit.

In some examples, the first downlink transmission and the third downlink transmission are included in a same component carrier. In some other examples, the first downlink transmission and the third downlink transmission are included in different component carriers. In some examples, a duration of the set of one or more symbol periods of the scheduling unit, or a duration of the scheduling unit, or both, is based on a symbol duration of a component carrier having a threshold subcarrier spacing.

In some examples, the order determination component 835 may be configured as or otherwise support a means for determining an order for counter downlink assignment index values of each of the two or more DCI messages based on an accumulative number of resource pairs in which the two or more DCI messages have been transmitted up to a scheduled carrier index and up to a first scheduling unit, each resource pair of the accumulative number of resource pairs including a serving cell and a scheduling unit including one or more symbol periods. In some examples, the codebook generation component 850 may be configured as or otherwise support a means for generating a codebook based on the counter downlink assignment index values and the order for the counter downlink assignment index values, where the transmitted feedback message includes the codebook.

In some examples, the order determination component 835 may be configured as or otherwise support a means for determining an order for total downlink assignment index values of the two or more DCI messages based on a number of resource pairs in which the two or more DCI messages have been transmitted up to a current scheduling unit, each resource pair of the number of resource pairs including a serving cell and a scheduling unit including one or more symbol periods. In some examples, the codebook generation component 850 may be configured as or otherwise support a means for generating a codebook based on the total downlink assignment index values and the order for the total downlink assignment index values, where the transmitted feedback message includes the codebook.

In some examples, the total downlink assignment index component 865 may be configured as or otherwise support a means for updating a total downlink assignment index value based on receiving respective DCI messages that are associated with different scheduling units, where the codebook for the feedback message based on the updated total downlink assignment index value.

In some examples, the downlink message identification component 845 may be configured as or otherwise support a means for identifying a last DCI message of the two or more DCI messages based on the order of the two or more DCI messages. In some examples, the resource identification component 855 may be configured as or otherwise support a means for identifying a set of uplink resources associated with the same transmission occasion based on a resource indicator field of the last DCI message.

In some examples, to support receiving the two or more DCI messages, the downlink message receiver 825 may be configured as or otherwise support a means for receiving one or more DCI messages within at least one monitoring occasion, each of the one or more DCI messages scheduling a respective downlink transmission, and where determining the order of the two or more DCI messages includes. In some examples, to support receiving the two or more DCI messages, the order determination component 835 may be configured as or otherwise support a means for determining an order of the one or more DCI messages based on the at least one monitoring occasion.

In some examples, the downlink message identification component 845 may be configured as or otherwise support a means for identifying a first DCI message in a first monitoring occasion, where a first symbol period includes a beginning of the first monitoring occasion, and where determining the order of the two or more DCI messages includes. In some examples, the order determination component 835 may be configured as or otherwise support a means for determining the order of the two or more DCI messages based on an order of the first symbol period and the time period including the beginning of each downlink transmission that is multiplexed with a DCI message.

In some examples, the downlink message identification component 845 may be configured as or otherwise support a means for identifying a first DCI message in a first monitoring occasion. In some examples, the downlink message identification component 845 may be configured as or otherwise support a means for identifying a second DCI message in a second monitoring occasion. In some examples, the order determination component 835 may be configured as or otherwise support a means for determining a first order of the first DCI message and the second DCI message based on the first monitoring occasion and the second monitoring occasion. In some examples, the order determination component 835 may be configured as or otherwise support a means for determining a second order of the at least one DCI message of the two or more DCI messages that are multiplexed with a downlink transmission.

In some examples, the codebook generation component 850 may be configured as or otherwise support a means for generating a first sub-codebook based on the first order of the first DCI message and the second DCI message. In some examples, the codebook generation component 850 may be configured as or otherwise support a means for generating a second sub-codebook based on the second order of the at least one DCI message of the two or more DCI messages that are multiplexed with a downlink transmission, where the feedback message includes the first sub-codebook and the second sub-codebook.

In some examples, the order determination component 835 may be configured as or otherwise support a means for determining a last DCI message from the one or more DCI messages, where a set of uplink resources associated with the same transmission occasion is based on a resource indicator field of the last DCI message.

In some examples, the order determination component 835 may be configured as or otherwise support a means for determining a last DCI message from the at least one DCI message that is multiplexed with a downlink transmission, where a set of uplink resources associated with the same transmission occasion is based on a resource indicator field of the last DCI message.

Figure 9:
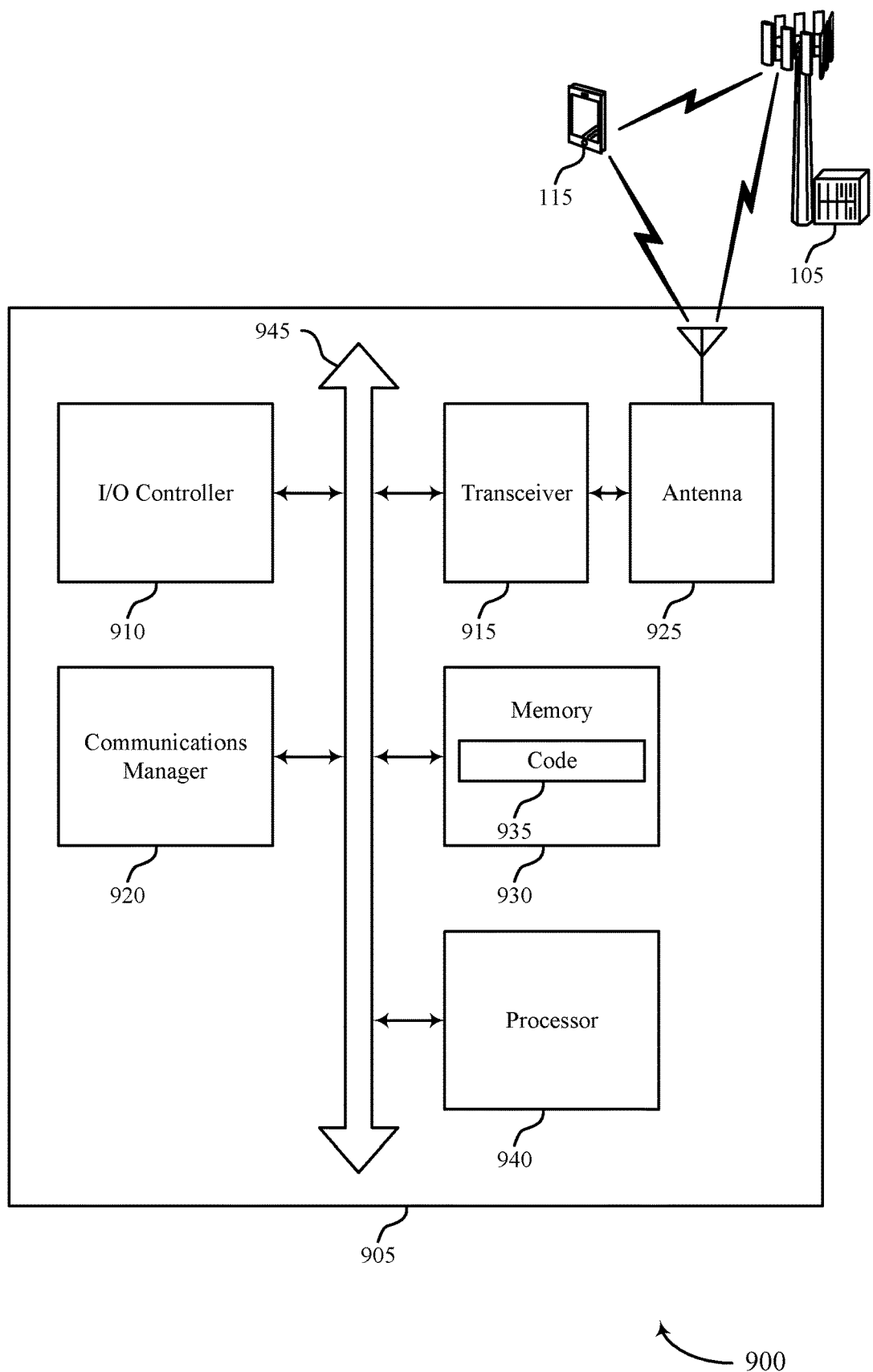
FIG. 9 shows a diagram of a system including a device that supports feedback techniques for DCI on a PDSCH in accordance with aspects of the present disclosure.

FIG. 9 shows a diagram of a system 900 including a device 905 that supports feedback techniques for DCI on a PDSCH in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting feedback techniques for DCI on a PDSCH). For example, the device 905 or a component of the device 905 may include a processor 940 and memory 930 coupled to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for receiving two or more DCI messages that each schedule respective downlink transmissions, where at least one DCI message of the two or more DCI messages is multiplexed with a downlink transmission and schedules an additional downlink transmission that is after the downlink transmission, and where a feedback message for the respective downlink transmissions is to be transmitted during a same transmission occasion. The communications manager 920 may be configured as or otherwise support a means for identifying, for each downlink transmission that is multiplexed with a DCI message, a time period including a beginning of the downlink transmission. The communications manager 920 may be configured as or otherwise support a means for determining an order of the two or more DCI messages based on the time period including the beginning of the downlink transmission. The communications manager 920 may be configured as or otherwise support a means for transmitting, during the same transmission occasion, the feedback message for the respective downlink transmissions scheduled by the two or more DCI messages, where the feedback message is based on the order of the two or more DCI messages.

By including or configuring the communications manager 920 in accordance with examples as described herein, the device 905 may support techniques for improved communication reliability. For example, the device 905 may receive one or more DCI messages on PDSCH resources with improved reliability based on receiving an indication of an order for the one or more DCI messages. More specifically, the device 905 may reduce a number of missed (e.g., unsuccessfully decoded) DCI messages based on the indication of the order.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of feedback techniques for DCI on a PDSCH as described herein, or the processor 940 and the memory 930 may be otherwise configured to perform or support such operations.

Figure 10:
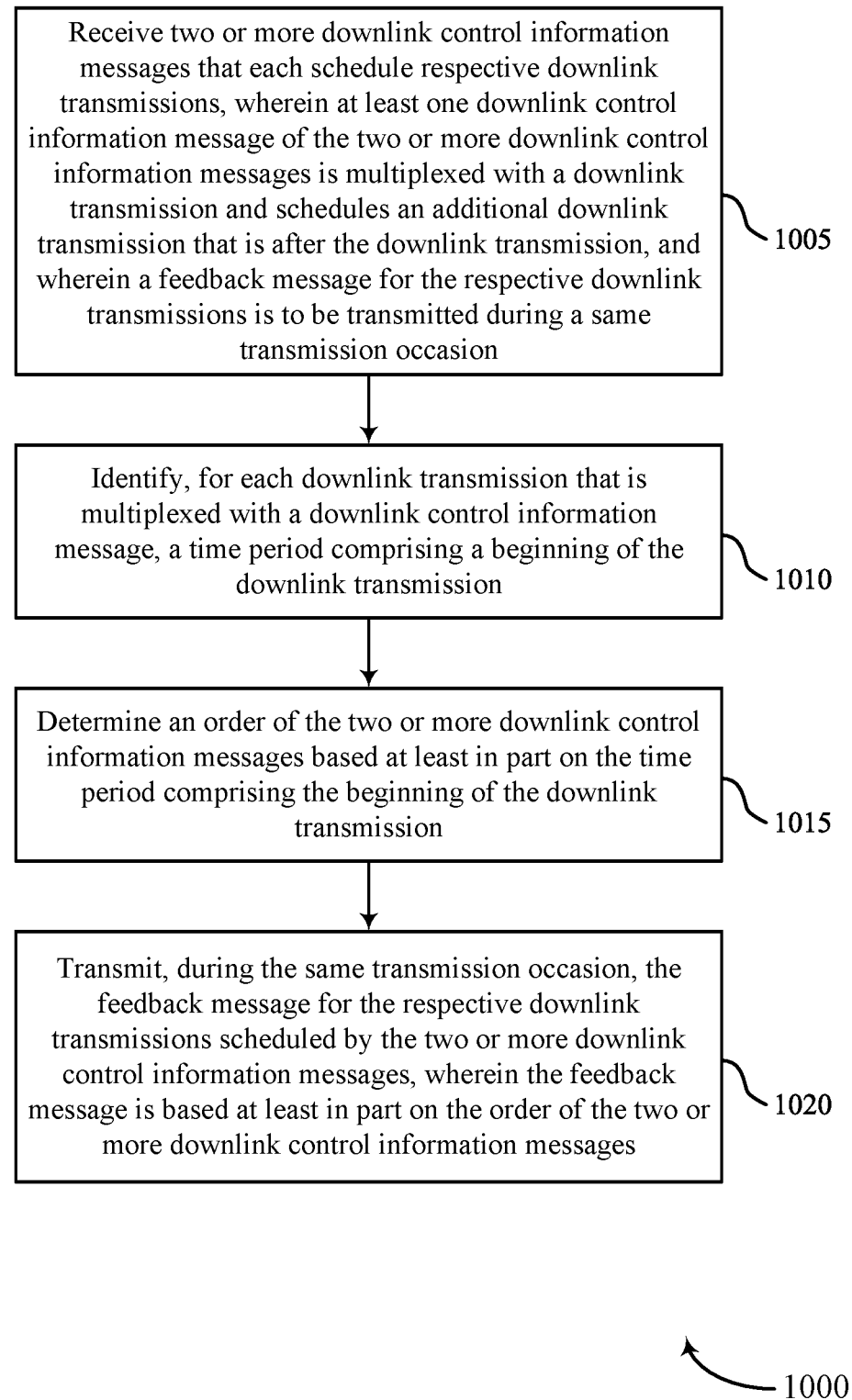
FIGS. 10 through 13 show flowcharts illustrating methods that support feedback techniques for DCI on a PDSCH in accordance with aspects of the present disclosure.

FIG. 10 shows a flowchart illustrating a method 1000 that supports feedback techniques for DCI on a PDSCH in accordance with aspects of the present disclosure. The operations of the method 1000 may be implemented by a UE or its components as described herein. For example, the operations of the method 1000 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1005, the method may include receiving two or more DCI messages that each schedule respective downlink transmissions, where at least one DCI message of the two or more DCI messages is multiplexed with a downlink transmission and schedules an additional downlink transmission that is after the downlink transmission, and where a feedback message for the respective downlink transmissions is to be transmitted during a same transmission occasion. The operations of 1005 may be performed in accordance with examples as disclosed herein. In some examples, aspects of the operations of 1005 may be performed by a downlink message receiver 825 as described with reference to FIG. 8.

At 1010, the method may include identifying, for each downlink transmission that is multiplexed with a DCI message, a time period including a beginning of the downlink transmission. The operations of 1010 may be performed in accordance with examples as disclosed herein. In some examples, aspects of the operations of 1010 may be performed by a time period component 830 as described with reference to FIG. 8.

At 1015, the method may include determining an order of the two or more DCI messages based on the time period including the beginning of the downlink transmission. The operations of 1015 may be performed in accordance with examples as disclosed herein. In some examples, aspects of the operations of 1015 may be performed by an order determination component 835 as described with reference to FIG. 8.

At 1020, the method may include transmitting, during the same transmission occasion, the feedback message for the respective downlink transmissions scheduled by the two or more DCI messages, where the feedback message is based on the order of the two or more DCI messages. The operations of 1020 may be performed in accordance with examples as disclosed herein. In some examples, aspects of the operations of 1020 may be performed by a feedback message transmitter 840 as described with reference to FIG. 8.

Figure 11:
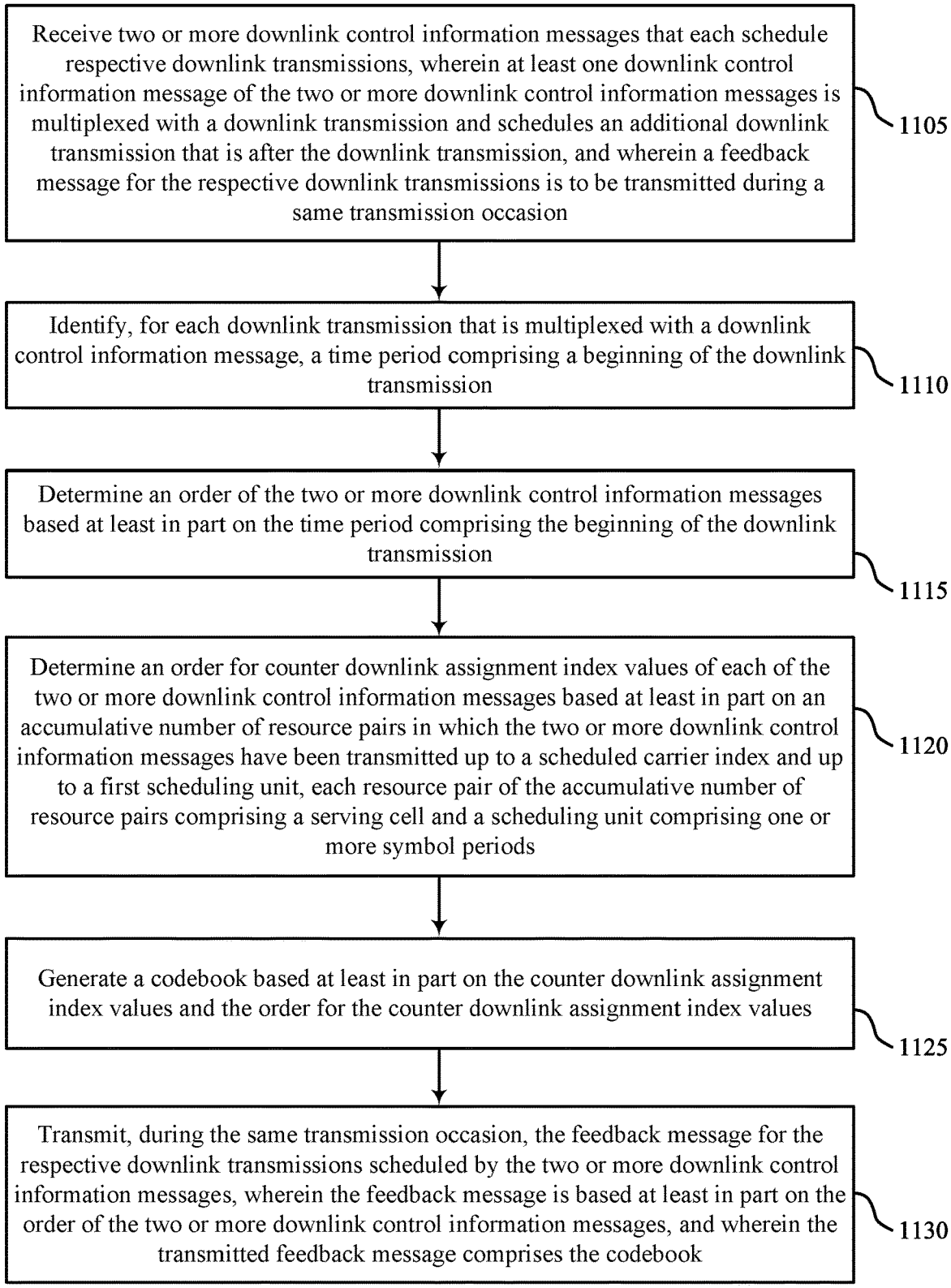

FIG. 11 shows a flowchart illustrating a method 1100 that supports feedback techniques for DCI on a PDSCH in accordance with aspects of the present disclosure. The operations of the method 1100 may be implemented by a UE or its components as described herein. For example, the operations of the method 1100 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1105, the method may include receiving two or more DCI messages that each schedule respective downlink transmissions, where at least one DCI message of the two or more DCI messages is multiplexed with a downlink transmission and schedules an additional downlink transmission that is after the downlink transmission, and where a feedback message for the respective downlink transmissions is to be transmitted during a same transmission occasion. The operations of 1105 may be performed in accordance with examples as disclosed herein. In some examples, aspects of the operations of 1105 may be performed by a downlink message receiver 825 as described with reference to FIG. 8.

At 1110, the method may include identifying, for each downlink transmission that is multiplexed with a DCI message, a time period including a beginning of the downlink transmission. The operations of 1110 may be performed in accordance with examples as disclosed herein. In some examples, aspects of the operations of 1110 may be performed by a time period component 830 as described with reference to FIG. 8.

At 1115, the method may include determining an order of the two or more DCI messages based on the time period including the beginning of the downlink transmission. The operations of 1115 may be performed in accordance with examples as disclosed herein. In some examples, aspects of the operations of 1115 may be performed by an order determination component 835 as described with reference to FIG. 8.

At 1120, the method may include determining an order for counter downlink assignment index values of each of the two or more DCI messages based on an accumulative number of resource pairs in which the two or more DCI messages have been transmitted up to a scheduled carrier index and up to a first scheduling unit, each resource pair of the accumulative number of resource pairs including a serving cell and a scheduling unit including one or more symbol periods. The operations of 1120 may be performed in accordance with examples as disclosed herein. In some examples, aspects of the operations of 1120 may be performed by an order determination component 835 as described with reference to FIG. 8.

At 1125, the method may include generating a codebook based on the counter downlink assignment index values and the order for the counter downlink assignment index values, where the transmitted feedback message includes the codebook. The operations of 1125 may be performed in accordance with examples as disclosed herein. In some examples, aspects of the operations of 1125 may be performed by a codebook generation component 850 as described with reference to FIG. 8.

At 1130, the method may include transmitting, during the same transmission occasion, the feedback message for the respective downlink transmissions scheduled by the two or more DCI messages, where the feedback message is based on the order of the two or more DCI messages. The operations of 1130 may be performed in accordance with examples as disclosed herein. In some examples, aspects of the operations of 1130 may be performed by a feedback message transmitter 840 as described with reference to FIG. 8.

Figure 12:
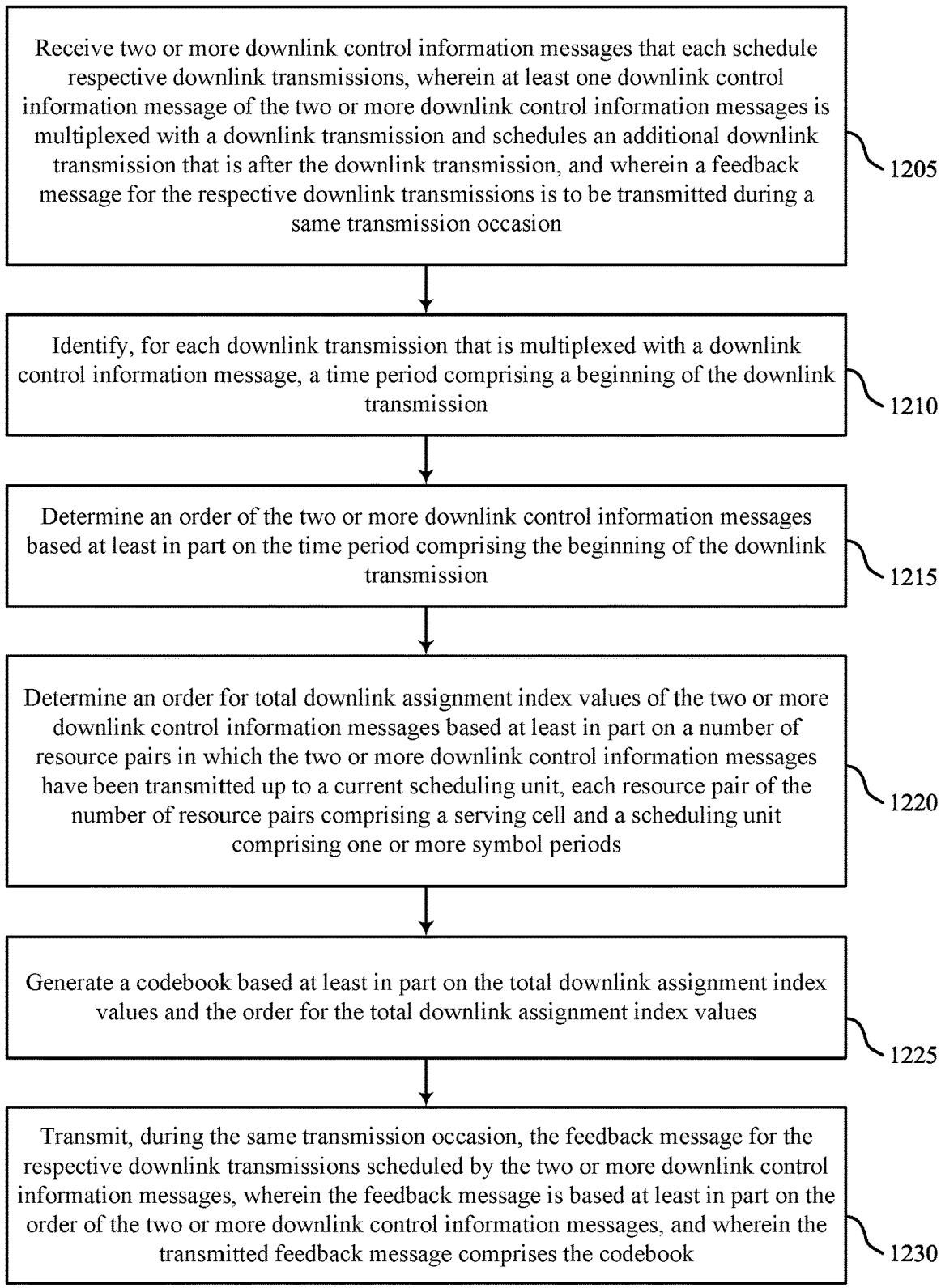

FIG. 12 shows a flowchart illustrating a method 1200 that supports feedback techniques for DCI on a PDSCH in accordance with aspects of the present disclosure. The operations of the method 1200 may be implemented by a UE or its components as described herein. For example, the operations of the method 1200 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1205, the method may include receiving two or more DCI messages that each schedule respective downlink transmissions, where at least one DCI message of the two or more DCI messages is multiplexed with a downlink transmission and schedules an additional downlink transmission that is after the downlink transmission, and where a feedback message for the respective downlink transmissions is to be transmitted during a same transmission occasion. The operations of 1205 may be performed in accordance with examples as disclosed herein. In some examples, aspects of the operations of 1205 may be performed by a downlink message receiver 825 as described with reference to FIG. 8.

At 1210, the method may include identifying, for each downlink transmission that is multiplexed with a DCI message, a time period including a beginning of the downlink transmission. The operations of 1210 may be performed in accordance with examples as disclosed herein. In some examples, aspects of the operations of 1210 may be performed by a time period component 830 as described with reference to FIG. 8.

At 1215, the method may include determining an order of the two or more DCI messages based on the time period including the beginning of the downlink transmission. The operations of 1215 may be performed in accordance with examples as disclosed herein. In some examples, aspects of the operations of 1215 may be performed by an order determination component 835 as described with reference to FIG. 8.

At 1220, the method may include determining an order for total downlink assignment index values of the two or more DCI messages based on a number of resource pairs in which the two or more DCI messages have been transmitted up to a current scheduling unit, each resource pair of the number of resource pairs including a serving cell and a scheduling unit including one or more symbol periods. The operations of 1220 may be performed in accordance with examples as disclosed herein. In some examples, aspects of the operations of 1220 may be performed by an order determination component 835 as described with reference to FIG. 8.

At 1225, the method may include generating a codebook based on the total downlink assignment index values and the order for the total downlink assignment index values. The operations of 1225 may be performed in accordance with examples as disclosed herein. In some examples, aspects of the operations of 1225 may be performed by a codebook generation component 850 as described with reference to FIG. 8.

At 1230, the method may include transmitting, during the same transmission occasion, the feedback message for the respective downlink transmissions scheduled by the two or more DCI messages, where the feedback message is based on the order of the two or more DCI messages. In some examples, the transmitted feedback message includes the codebook. The operations of 1230 may be performed in accordance with examples as disclosed herein. In some examples, aspects of the operations of 1230 may be performed by a feedback message transmitter 840 as described with reference to FIG. 8.

Figure 13:
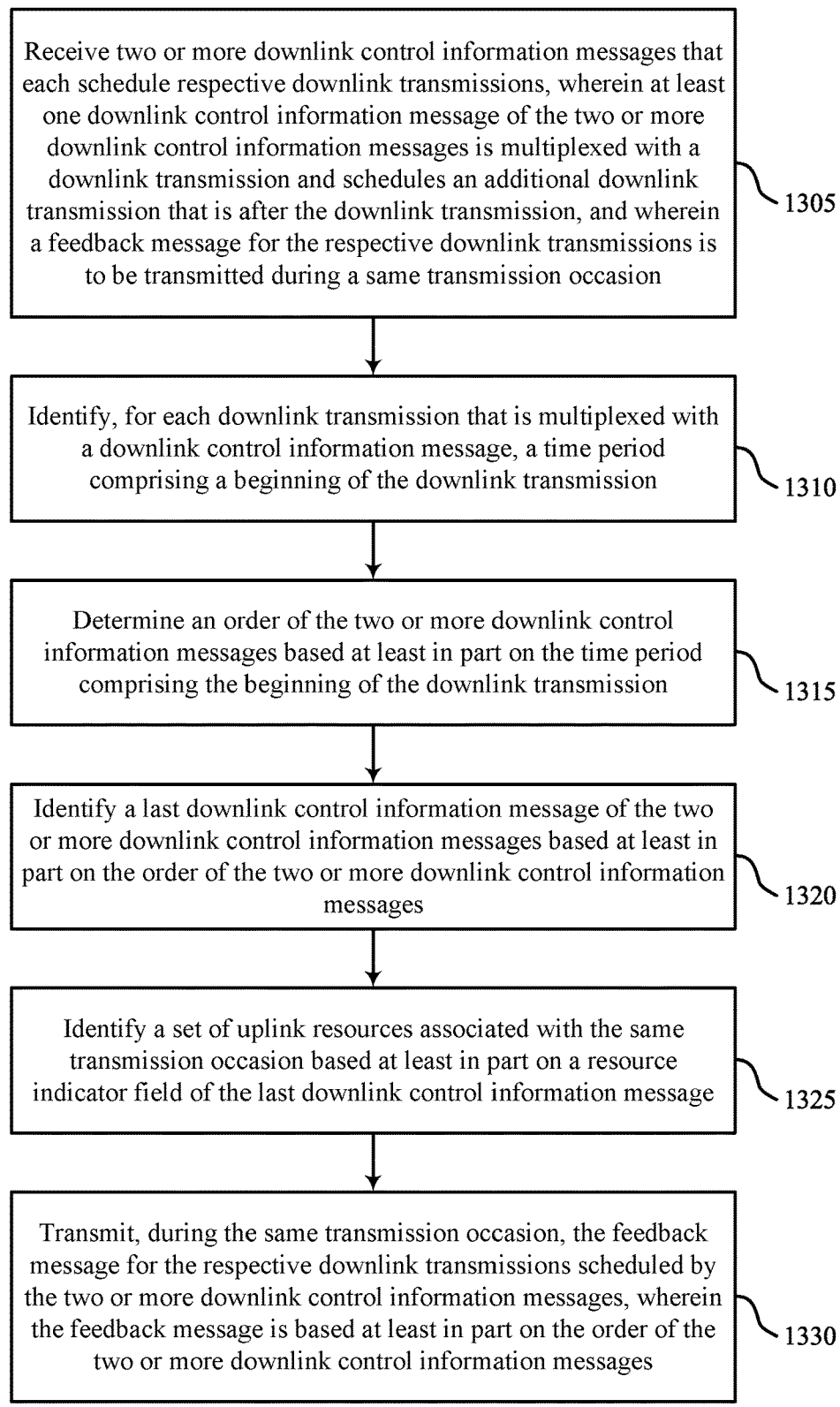

FIG. 13 shows a flowchart illustrating a method 1300 that supports feedback techniques for DCI on a PDSCH in accordance with aspects of the present disclosure. The operations of the method 1300 may be implemented by a UE or its components as described herein. For example, the operations of the method 1300 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1305, the method may include receiving two or more DCI messages that each schedule respective downlink transmissions, where at least one DCI message of the two or more DCI messages is multiplexed with a downlink transmission and schedules an additional downlink transmission that is after the downlink transmission, and where a feedback message for the respective downlink transmissions is to be transmitted during a same transmission occasion. The operations of 1305 may be performed in accordance with examples as disclosed herein. In some examples, aspects of the operations of 1305 may be performed by a downlink message receiver 825 as described with reference to FIG. 8.

At 1310, the method may include identifying, for each downlink transmission that is multiplexed with a DCI message, a time period including a beginning of the downlink transmission. The operations of 1310 may be performed in accordance with examples as disclosed herein. In some examples, aspects of the operations of 1310 may be performed by a time period component 830 as described with reference to FIG. 8.

At 1315, the method may include determining an order of the two or more DCI messages based on the time period including the beginning of the downlink transmission. The operations of 1315 may be performed in accordance with examples as disclosed herein. In some examples, aspects of the operations of 1315 may be performed by an order determination component 835 as described with reference to FIG. 8.

At 1320, the method may include identifying a last DCI message of the two or more DCI messages based on the order of the two or more DCI messages. The operations of 1320 may be performed in accordance with examples as disclosed herein. In some examples, aspects of the operations of 1320 may be performed by a downlink message identification component 845 as described with reference to FIG. 8.

At 1325, the method may include identifying a set of uplink resources associated with the same transmission occasion based on a resource indicator field of the last DCI message. The operations of 1325 may be performed in accordance with examples as disclosed herein. In some examples, aspects of the operations of 1325 may be performed by a resource identification component 855 as described with reference to FIG. 8.

At 1330, the method may include transmitting, during the same transmission occasion, the feedback message for the respective downlink transmissions scheduled by the two or more DCI messages, where the feedback message is based on the order of the two or more DCI messages. The operations of 1330 may be performed in accordance with examples as disclosed herein. In some examples, aspects of the operations of 1330 may be performed by a feedback message transmitter 840 as described with reference to FIG. 8.

The following provides an overview of aspects of the present disclosure:

Aspect 1: A method for wireless communication at a UE, comprising: receiving two or more DCI messages that each schedule respective downlink transmissions, wherein at least one DCI message of the two or more DCI messages is multiplexed with a downlink transmission and schedules an additional downlink transmission that is after the downlink transmission, and wherein a feedback message for the respective downlink transmissions is to be transmitted during a same transmission occasion; identifying, for each downlink transmission that is multiplexed with a DCI message, a time period comprising a beginning of the downlink transmission; determining an order of the two or more DCI messages based at least in part on the time period comprising the beginning of the downlink transmission; and transmitting, during the same transmission occasion, the feedback message for the respective downlink transmissions scheduled by the two or more DCI messages, wherein the feedback message is based at least in part on the order of the two or more DCI messages.

Aspect 2: The method of aspect 1, wherein determining the order of the two or more DCI messages comprises: identifying a first downlink transmission that is multiplexed with a first DCI message of the two or more DCI messages, wherein a first symbol period comprises a beginning of the first downlink transmission; identifying a second downlink transmission multiplexed with a second DCI message of the two or more DCI messages, wherein a second symbol period that is different from the first symbol period comprises a beginning of the second downlink transmission; and determining an order of the first DCI message and the second DCI message based at least in part on an order of the first symbol period and the second symbol period.

Aspect 3: The method of aspect 2, wherein the first symbol period is before the second symbol period, the method further comprising: determining that the first DCI message is ordered before the second DCI message based at least in part on the first symbol period being before the second symbol period.

Aspect 4: The method of any of aspects 2 through 3, wherein the first symbol period is within a first scheduling unit comprising a first set of one or more symbol periods and the second symbol period is within a second scheduling unit comprising a second set of one or more symbol periods, the method further comprising: determining the order of the first DCI message and the second DCI message based at least in part on an order of the first scheduling unit and the second scheduling unit.

Aspect 5: The method of aspect 4, wherein one or both of the first scheduling unit or the second scheduling unit comprises at least one of a slot, a set of seven symbol periods within a slot, a set of four symbol periods within a slot, a set of six symbol periods in a slot, or a single symbol period.

Aspect 6: The method of any of aspects 2 through 5, wherein determining the order of the two or more DCI messages comprises: identifying a first carrier index value associated with a third downlink transmission scheduled by the first DCI message, wherein the first symbol period is within a scheduling unit comprising a set of one or more symbol periods; identifying a second carrier index value associated with a fourth downlink transmission that is scheduled by the second DCI message, wherein the second symbol period is within the scheduling unit; and determining the order of the first DCI message and the second DCI message based at least in part on an order of the first carrier index value and the second carrier index value.

Aspect 7: The method of aspect 6, wherein the first carrier index value is less than the second carrier index value and the first symbol period is after the second symbol period within the scheduling unit, the method further comprising: determining that the second DCI message is ordered before the first DCI message based at least in part on the first symbol period being after the second symbol period.

Aspect 8: The method of any of aspects 6 through 7, wherein the first carrier index value is less than the second carrier index value and the first symbol period is before the second symbol period within the scheduling unit, the method further comprising: determining that the first DCI message is ordered before the second DCI message based at least in part on the first carrier index value being less than the second carrier index value and the first symbol period and the second symbol period being within the scheduling unit.

Aspect 9: The method of any of aspects 6 through 8, wherein the first downlink transmission and the third downlink transmission are included in a same CC.

Aspect 10: The method of any of aspects 6 through 9, wherein the first downlink transmission and the third downlink transmission are included in different CCs.

Aspect 11: The method of any of aspects 6 through 10, wherein a duration of the set of one or more symbol periods of the scheduling unit, or a duration of the scheduling unit, or both, is based at least in part on a symbol duration of a CC having a threshold SCS.

Aspect 12: The method of any of aspects 1 through 11, further comprising: determining an order for cDAI values of each of the two or more DCI messages based at least in part on an accumulative number of resource pairs in which the two or more DCI messages have been transmitted up to a scheduled carrier index and up to a first scheduling unit, each resource pair of the accumulative number of resource pairs comprising a serving cell and a scheduling unit comprising one or more symbol periods; and generating a codebook based at least in part on the cDAI values and the order for the cDAI values, wherein the transmitted feedback message comprises the codebook Aspect 13: The method of any of aspects 1 through 12, further comprising: determining an order for tDAI values of the two or more DCI messages based at least in part on a number of resource pairs in which the two or more DCI messages have been transmitted up to a current scheduling unit, each resource pair of the number of resource pairs comprising a serving cell and a scheduling unit comprising one or more symbol periods; and generating a codebook based at least in part on the tDAI values and the order for the tDAI values, wherein the transmitted feedback message comprises the codebook Aspect 14: The method of aspect 13, further comprising: updating a tDAI value based at least in part on receiving respective DCI messages that are associated with different scheduling units, wherein the codebook for the feedback message based at least in part on the updated tDAI value.

Aspect 15: The method of any of aspects 1 through 14, further comprising: identifying a last DCI message of the two or more DCI messages based at least in part on the order of the two or more DCI messages; and identifying a set of uplink resources associated with the same transmission occasion based at least in part on a resource indicator field of the last DCI message Aspect 16: The method of any of aspects 1 through 15, wherein receiving the two or more DCI messages comprises: receiving one or more DCI messages within at least one monitoring occasion, each of the one or more DCI messages scheduling a respective downlink transmission, and wherein determining the order of the two or more DCI messages comprises: determining an order of the one or more DCI messages based at least in part on the at least one monitoring occasion.

Aspect 17: The method of aspect 16, further comprising: identifying a first DCI message in a first monitoring occasion, wherein a first symbol period comprises a beginning of the first monitoring occasion, and wherein determining the order of the two or more DCI messages comprises: determining the order of the two or more DCI messages based at least in part on an order of the first symbol period and the time period comprising the beginning of each downlink transmission that is multiplexed with a DCI message.

Aspect 18: The method of any of aspects 16 through 17, further comprising: identifying a first DCI message in a first monitoring occasion; identifying a second DCI message in a second monitoring occasion; determining a first order of the first DCI message and the second DCI message based at least in part on the first monitoring occasion and the second monitoring occasion; and determining a second order of the at least one DCI message of the two or more DCI messages that are multiplexed with a downlink transmission.

Aspect 19: The method of aspect 18, further comprising: generating a first sub-codebook based at least in part on the first order of the first DCI message and the second DCI message; and generating a second sub-codebook based at least in part on the second order of the at least one DCI message of the two or more DCI messages that are multiplexed with a downlink transmission, wherein the feedback message comprises the first sub-codebook and the second sub-codebook.

Aspect 20: The method of any of aspects 18 through 19, further comprising: determining a last DCI message from the one or more DCI messages, wherein a set of uplink resources associated with the same transmission occasion is based at least in part on a resource indicator field of the last DCI message.

Aspect 21: The method of any of aspects 18 through 20, further comprising: determining a last DCI message from the at least one DCI message that is multiplexed with a downlink transmission, wherein a set of uplink resources associated with the same transmission occasion is based at least in part on a resource indicator field of the last DCI message.

Aspect 22: An apparatus for wireless communication at a UE, comprising a processor; memory coupled with the processor; and instructions stored in the memory and executable by the processor to cause the apparatus to perform a method of any of aspects 1 through 21.

Aspect 23: An apparatus for wireless communication at a UE, comprising at least one means for performing a method of any of aspects 1 through 21.

Aspect 24: A non-transitory computer-readable medium storing code for wireless communication at a UE, the code comprising instructions executable by a processor to perform a method of any of aspects 1 through 21.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving two or more downlink control information messages that schedule respective downlink transmissions, wherein at least one downlink control information message of the two or more downlink control information messages is multiplexed with a downlink transmission;
   identifying a first transmission time interval of each downlink transmission multiplexed with one of the two or more downlink control information messages;
   generating feedback for the respective downlink transmissions based at least in part on an order of the two or more downlink control information messages, wherein the order is determined according to the first transmission time interval of each downlink transmission multiplexed with one of the two or more downlink control information messages; and
   transmitting an indication of the feedback for the respective downlink transmissions via a set of uplink resources indicated by a last downlink control information message of the two or more downlink control information messages.

2. The method of claim 1, further comprising:
   identifying a first downlink transmission that is multiplexed with a first downlink control information message of the two or more downlink control information messages, wherein a first symbol period comprises a beginning of the first downlink transmission;
   identifying a second downlink transmission multiplexed with a second downlink control information message of the two or more downlink control information messages, wherein a second symbol period that is different from the first symbol period comprises a beginning of the second downlink transmission; and
   determining an order of the first downlink control information message and the second downlink control information message based at least in part on an order of the first symbol period and the second symbol period.

3. The method of claim 2, wherein the first symbol period is before the second symbol period, the method further comprising:
   determining that the first downlink control information message is ordered before the second downlink control information message based at least in part on the first symbol period being before the second symbol period.

4. The method of claim 2, wherein the first symbol period is within a first scheduling unit comprising a first set of one or more symbol periods and the second symbol period is within a second scheduling unit comprising a second set of one or more symbol periods, the method further comprising:

determining the order of the first downlink control information message and the second downlink control information message based at least in part on an order of the first scheduling unit and the second scheduling unit.

5. The method of claim 4, wherein one or both of the first scheduling unit or the second scheduling unit comprises at least one of a slot, a set of seven symbol periods within a slot, a set of four symbol periods within a slot, a set of six symbol periods in a slot, or a single symbol period.

6. The method of claim 2, further comprising:

identifying a first carrier index value associated with a third downlink transmission scheduled by the first downlink control information message, wherein the first symbol period is within a scheduling unit comprising a set of one or more symbol periods;

identifying a second carrier index value associated with a fourth downlink transmission that is scheduled by the second downlink control information message, wherein the second symbol period is within the scheduling unit; and determining the order of the first downlink control information message and the second downlink control information message based at least in part on an order of the first carrier index value and the second carrier index value.

7. The method of claim 6, wherein the first carrier index value is less than the second carrier index value and the first symbol period is after the second symbol period within the scheduling unit, the method further comprising:

determining that the second downlink control information message is ordered before the first downlink control information message based at least in part on the first symbol period being after the second symbol period.

8. The method of claim 6, wherein the first carrier index value is less than the second carrier index value and the first symbol period is before the second symbol period within the scheduling unit, the method further comprising:

determining that the first downlink control information message is ordered before the second downlink control information message based at least in part on the first carrier index value being less than the second carrier index value and the first symbol period and the second symbol period being within the scheduling unit.

9. The method of claim 6, wherein the first downlink transmission and the third downlink transmission are included in a same component carrier.

10. The method of claim 6, wherein the first downlink transmission and the third downlink transmission are included in different component carriers.

11. The method of claim 6, wherein a duration of the set of one or more symbol periods of the scheduling unit, or a duration of the scheduling unit, or both, is based at least in part on a symbol duration of a component carrier having a threshold subcarrier spacing.

12. The method of claim 1, further comprising:

determining an order for counter downlink assignment index values of each of the two or more downlink control information messages based at least in part on an accumulative number of resource pairs in which the two or more downlink control information messages have been transmitted up to a scheduled carrier index and up to a first scheduling unit, each resource pair of the accumulative number of resource pairs comprising a serving cell and a scheduling unit comprising one or more symbol periods; and generating a codebook based at least in part on the counter downlink assignment index values and the order for the counter downlink assignment index values, wherein the feedback for the respective downlink transmissions comprises the codebook.

13. The method of claim 1, further comprising:

determining an order for total downlink assignment index values of the two or more downlink control information messages based at least in part on a number of resource pairs in which the two or more downlink control information messages have been transmitted up to a current scheduling unit, each resource pair of the number of resource pairs comprising a serving cell and a scheduling unit comprising one or more symbol periods; and generating a codebook based at least in part on the total downlink assignment index values and the order for the total downlink assignment index values, wherein the feedback for the respective downlink transmissions comprises the codebook.

14. The method of claim 13, further comprising:

updating a total downlink assignment index value based at least in part on receiving respective downlink control information messages that are associated with different scheduling units, wherein the codebook is based at least in part on updating the total downlink assignment index value.

15. The method of claim 1, further comprising:

identifying the last downlink control information message of the two or more downlink control information messages based at least in part on the order of the two or more downlink control information messages; and identifying the set of uplink resources associated with a same transmission occasion based at least in part on a resource indicator field of the last downlink control information message.

16. The method of claim 1, wherein receiving the two or more downlink control information messages comprises:

receiving one or more downlink control information messages within at least one monitoring occasion, each of the one or more downlink control information messages scheduling a respective downlink transmission, the method further comprising:

determining an order of the one or more downlink control information messages based at least in part on the at least one monitoring occasion.

17. The method of claim 16, further comprising:

identifying a first downlink control information message in a first monitoring occasion, wherein a first symbol period comprises a beginning of the first monitoring occasion; and determining the order of the two or more downlink control information messages based at least in part on an order of the first symbol period and the first transmission time interval of each downlink transmission that is multiplexed with a downlink control information message.

18. The method of claim 16, further comprising:

identifying a first downlink control information message in a first monitoring occasion;

identifying a second downlink control information message in a second monitoring occasion;

determining a first order of the first downlink control information message and the second downlink control information message based at least in part on the first monitoring occasion and the second monitoring occasion; and determining a second order of the at least one downlink control information message that is multiplexed with the downlink transmission.

19. The method of claim 18, further comprising:
generating a first sub-codebook based at least in part on the first order of the first downlink control information message and the second downlink control information message; and
generating a second sub-codebook based at least in part on the second order of the at least one downlink control information message that is multiplexed with the downlink transmission, wherein the feedback for the respective downlink transmissions comprises the first sub-codebook and the second sub-codebook.

20. The method of claim 18, further comprising:
determining the last downlink control information message from the one or more downlink control information messages, wherein the set of uplink resources associated with a same transmission occasion is based at least in part on a resource indicator field of the last downlink control information message.

21. The method of claim 18, further comprising:
determining the last downlink control information message from the at least one downlink control information message that is multiplexed with a downlink transmission, wherein the set of uplink resources associated with a same transmission occasion is based at least in part on a resource indicator field of the last downlink control information message.

22. An apparatus for wireless communication at a user equipment (UE), comprising:
a processor;
memory coupled with the processor; and
instructions stored in the memory and executable by the processor to cause the apparatus to:
receive two or more downlink control information messages that schedule respective downlink transmissions, wherein at least one downlink control information message of the two or more downlink control information messages is multiplexed with a downlink transmission;
identify a first transmission time interval of each downlink transmission multiplexed with one of the two or more downlink control information messages;
generate feedback for the respective downlink transmissions based at least in part on an order of the two or more downlink control information messages, wherein the order is determined according to the first transmission time interval of each downlink transmission multiplexed with one of the two or more downlink control information messages; and
transmit an indication of the feedback for the respective downlink transmissions via a set of uplink resources indicated by a last downlink control information message of the two or more downlink control information messages.

23. The apparatus of claim 22, wherein the instructions are further executable by the processor to cause the apparatus to:
identify a first downlink transmission that is multiplexed with a first downlink control information message of the two or more downlink control information messages, wherein a first symbol period comprises a beginning of the first downlink transmission;
identify a second downlink transmission multiplexed with a second downlink control information message of the two or more downlink control information messages, wherein a second symbol period that is different from the first symbol period comprises a beginning of the second downlink transmission; and
determine an order of the first downlink control information message and the second downlink control information message based at least in part on an order of the first symbol period and the second symbol period.

24. The apparatus of claim 23, wherein the first symbol period is before the second symbol period, and wherein the instructions are further executable by the processor to cause the apparatus to:
determine that the first downlink control information message is ordered before the second downlink control information message based at least in part on the first symbol period being before the second symbol period.

25. The apparatus of claim 23, wherein the first symbol period is within a first scheduling unit comprising a first set of one or more symbol periods and the second symbol period is within a second scheduling unit comprising a second set of one or more symbol periods, and wherein the instructions are further executable by the processor to cause the apparatus to:
determine the order of the first downlink control information message and the second downlink control information message based at least in part on an order of the first scheduling unit and the second scheduling unit.

26. The apparatus of claim 23, wherein the instructions are further executable by the processor to cause the apparatus to:
identify a first carrier index value associated with a third downlink transmission scheduled by the first downlink control information message, wherein the first symbol period is within a scheduling unit comprising a set of one or more symbol periods;
identify a second carrier index value associated with a fourth downlink transmission that is scheduled by the second downlink control information message, wherein the second symbol period is within the scheduling unit; and
determine the order of the first downlink control information message and the second downlink control information message based at least in part on an order of the first carrier index value and the second carrier index value.

27. The apparatus of claim 22, wherein the instructions are further executable by the processor to cause the apparatus to:
determine an order for counter downlink assignment index values of each of the two or more downlink control information messages based at least in part on an accumulative number of resource pairs in which the two or more downlink control information messages have been transmitted up to a scheduled carrier index and up to a first scheduling unit, each resource pair of the accumulative number of resource pairs comprising a serving cell and a scheduling unit comprising one or more symbol periods; and
generate a codebook based at least in part on the counter downlink assignment index values and the order for the counter downlink assignment index values, wherein the feedback for the respective downlink transmissions comprises the codebook.

28. The apparatus of claim 22, wherein the instructions are further executable by the processor to cause the apparatus to:
determine an order for total downlink assignment index values of the two or more downlink control information messages based at least in part on a number of resource pairs in which the two or more downlink control information messages have been transmitted up to a current scheduling unit, each resource pair of the number of resource pairs comprising a serving cell and a scheduling unit comprising one or more symbol periods; and generate a codebook based at least in part on the total downlink assignment index values and the order for the total downlink assignment index values, wherein the feedback for the respective downlink transmissions comprises the codebook.

29. The apparatus of claim 22, wherein the instructions are further executable by the processor to cause the apparatus to:

identify the last downlink control information message of the two or more downlink control information messages based at least in part on the order of the two or more downlink control information messages; and identify the set of uplink resources associated with a same transmission occasion based at least in part on a resource indicator field of the last downlink control information message.

30. The apparatus of claim 22, wherein the instructions to receive the two or more downlink control information messages are executable by the processor to cause the apparatus to:

receive one or more downlink control information messages within at least one monitoring occasion, each of the one or more downlink control information messages scheduling a respective downlink transmission, and wherein the instructions are further executable by the processor to cause the apparatus to:

determine an order of the one or more downlink control information messages based at least in part on the at least one monitoring occasion.

* * * * *